United States Patent
Lukic et al.

(10) Patent No.: US 10,684,129 B2
(45) Date of Patent: Jun. 16, 2020

(54) METHOD FOR CHECKING AND/OR CALIBRATING A HORIZONTAL AXIS OF A ROTATING LASER

(71) Applicant: Hilti Aktiengesellschaft, Schaan (LI)

(72) Inventors: Sasha Lukic, Buchs (CH); Guenter Sanchen, Grabs (CH)

(73) Assignee: Hilti Aktiengesellschaft, Schaan (LI)

( * ) Notice: Subject to any disclaimer, the term of this patent is extended or adjusted under 35 U.S.C. 154(b) by 206 days.

(21) Appl. No.: 15/778,576

(22) PCT Filed: Nov. 23, 2016

(86) PCT No.: PCT/EP2016/078495
§ 371 (c)(1),
(2) Date: May 23, 2018

(87) PCT Pub. No.: WO2017/093089
PCT Pub. Date: Jun. 8, 2017

(65) Prior Publication Data
US 2018/0356223 A1    Dec. 13, 2018

(30) Foreign Application Priority Data
Nov. 30, 2015 (EP) .................................... 15197026

(51) Int. Cl.
*G01C 5/00* (2006.01)
*G01C 15/00* (2006.01)
*G01C 25/00* (2006.01)

(52) U.S. Cl.
CPC ......... *G01C 15/004* (2013.01); *G01C 15/008* (2013.01); *G01C 25/00* (2013.01)

(58) Field of Classification Search
CPC .................................................. G01C 15/004
(Continued)

(56) References Cited

U.S. PATENT DOCUMENTS

2003/0145474 A1* 8/2003 Tacklind .............. G01C 15/004
33/290
2005/0007125 A1* 1/2005 Heger ...................... G01C 9/14
324/662

(Continued)

FOREIGN PATENT DOCUMENTS

DE      197 16 710 A1    11/1997
EP      1 203 930 01      5/2002

(Continued)

OTHER PUBLICATIONS

PCT/EP2016/078495, International Search Report (PCT/ISA/220 and PCT/ISA/210) dated Jan. 23, 2017, with partial English translation, enclosing Written Opinion of the International Searching Authority (PCT/ISA/237) (Sixteen (16) pages).
"UL300 Bedienungsanleitung", TRIAX, Oct. 1, 2004, XP055269227, URL: http://www.glm-laser.com/glm/files/ul300_bedienungsanleitung.pdf, 32 total pages.

(Continued)

*Primary Examiner* — George B Bennett
(74) *Attorney, Agent, or Firm* — Crowell & Moring LLP

(57) ABSTRACT

A method for checking and/or calibrating a first or a second horizontal axis of a rotating laser, which emits a laser beam rotating about an axis of rotation, with the aid of a laser receiver. The rotating laser is positioned at a measuring distance to the laser receiver, the rotating laser being aligned in the horizontal position and the laser receiver being aligned in a longitudinal arrangement.

15 Claims, 9 Drawing Sheets

(58) Field of Classification Search
USPC .......................................................... 33/228
See application file for complete search history.

(56) References Cited

U.S. PATENT DOCUMENTS

| | | | | |
|---|---|---|---|---|
| 2010/0186243 | A1* | 7/2010 | Schumacher | G01B 21/22 |
| | | | | 33/228 |
| 2014/0283397 | A1* | 9/2014 | Fessler | G01B 11/00 |
| | | | | 33/228 |
| 2018/0335316 | A1* | 11/2018 | Lukic | G01C 25/00 |
| 2019/0154443 | A1* | 5/2019 | Winter | G01S 7/4813 |
| 2019/0360806 | A1* | 11/2019 | Ohtomo | G01C 15/06 |

FOREIGN PATENT DOCUMENTS

| | | |
|---|---|---|
| EP | 2 781 880 A1 | 9/2014 |
| EP | 2 833 159 A1 | 2/2015 |

OTHER PUBLICATIONS

"Laser LAR-250—Bedienungsanleitung", Stabila, Apr. 1, 2008, XP002757136, URL: http://ww.stabila.de/cms/upload/download/pdf/manual/de/lar250_manual_de.pdf, 17 total pages.

U.S. Appl. No. "Method for Orienting a Device Axis in a Defined State", filed May 23, 2018, Inventor: Sasha Lukic.

U.S. Appl. No. "Method for Measuring an Operating Temperature of Equipment", filed May 23, 2018, Inventor: Sasha Lukic.

U.S. Appl. No. "Method for Measuring a Measurement Distance Between a Rotating Laser and a Laser Receiver", filed May 23, 2018, Inventor: Andreas Winter et al.

U.S. Appl. No. "Method for Checking a Rotary Laser Level for Cone Errors", filed May 23, 2018, Inventor: Sasha Lukic.

U.S. Appl. No. "Method for Checking and/or Calibrating a Vertical Axis of a Rotating Laser", filed May 23, 2018, Inventor: Sasha Lukic et al.

* cited by examiner

METHOD FOR CHECKING AND/OR CALIBRATING A HORIZONTAL AXIS OF A ROTATING LASER

CROSS REFERENCE TO RELATED APPLICATIONS

This application claims the priority of International Application No. PCT/EP2016/078495, filed Nov. 23, 2016 and European Patent Document No. 15197026.6, filed Nov. 30, 2015, the disclosures of which are expressly incorporated by reference herein.

BACKGROUND AND SUMMARY OF THE INVENTION

The present invention relates to a method for checking and/or calibrating a horizontal axis of a rotating laser.

Rotating lasers are used indoors and outdoors for leveling and marking tasks, such as displaying laser markings running horizontally, vertically, or diagonally on a target surface, or determining and checking horizontal heights, perpendicular lines, alignments, and plumb points. Rotating lasers can be arranged in various device positions, which are designed as horizontal positions and vertical positions. A distinction is thereby made between horizontally usable rotating lasers, which are solely used in the horizontal position, and horizontally and vertically usable rotating lasers, which are used in the horizontal position and the vertical position. Horizontally usable rotating lasers have as device axes a first horizontal axis and a second horizontal axis, which run perpendicular to each other and span a horizontal plane. Horizontally and vertically usable rotating lasers have as a device axis, in addition to the first and second horizontal axes, a vertical axis that runs perpendicular to the horizontal plane of the first and second horizontal axes.

To ensure the accuracy of a rotating laser when in operation, the accuracy must be checked regularly and if a maximum difference defined by the device manufacturer is exceeded, the rotating laser must be calibrated. The accuracy of the rotating laser is thereby checked for every device axis. Methods are known for checking and/or calibrating a horizontal axis and for checking and/or calibrating a vertical axis. For horizontally usable rotating lasers, the first and second horizontal axes are checked sequentially, wherein the sequence is arbitrary. For horizontally and vertically usable rotating lasers, after the first and second horizontal axes are checked, a check of the vertical axis is performed.

The orientation of the device axes in a defined state occurs by means of a leveling device of the rotating laser. The defined state of the rotating laser in the horizontal position is referred to as the horizontal state and in the vertical position as the vertical state. The leveling device comprises a first leveling unit that orients the first horizontal axis in a first defined state, a second leveling unit that orients the second horizontal axis in a second defined state, and for a vertically usable rotating laser, there is a third leveling unit that orients the vertical axis in a third defined state. Each of the leveling units comprises an inclination sensor that measures the inclination of the device axis, and an adjustment element with which the inclination of the device axis can be adjusted. Ideally, the inclination sensors are oriented parallel to the allocated device axes. If an inclination sensor is not parallel to the allocated device axis, the device axis will have an inclination error.

In the operating instructions of their rotating lasers, the device manufacturers of horizontally and vertically usable rotating lasers define methods for checking the first and second horizontal axes, which are to be performed regularly by the operator, and methods for calibrating the vertical axis, which are to be performed regularly by the operator, if the established maximum difference for the horizontal axis is exceeded. The known methods for checking and/or calibrating a horizontal axis are based on the principle of an envelope measurement. The rotating lasers are set up in the horizontal position on a stable substrate or on a tripod at a measurement distance to a measuring surface and the horizontal axes of the rotating laser are oriented in a horizontal state. Every device manufacturer defines the measurement distance between the rotating laser and the measuring surface and establishes a maximum difference for the horizontal axes.

In the known methods for checking the horizontal axes, the rotating laser is oriented in a first angular position in which the horizontal axis to be checked is pointed toward the measurement surface and the position in which the laser beam strikes the measurement surface is marked as a first control point. The rotating laser is rotated by 180° around the axis of rotation into a second angular position in which the horizontal axis to be checked is pointed opposite to the first angular position on the measurement surface, and the position in which the laser beam strikes the measurement surface is marked as the second control point. The distance between the first and second control points on the measurement surface is determined as the difference and compared with the maximum difference for the horizontal axes specified by the unit manufacturer. If the difference is greater than the maximum difference, a calibration of the checked horizontal axis or a calibration of all the unit axes of the rotational laser is necessary.

The known methods for the calibration of a horizontal axis are carried out after the checking of the horizontal axes, if the difference between the first and second control points on the measurement surface is greater than the maximum difference. If the position and orientation of the rotating laser did not change, the calibration of the horizontal axis by means of the first and second control points on the measurement surface can be performed. The rotating laser is adjusted by means of the leveling device until the laser plane is located in the middle between the first and second control points. This position of the laser plane is stored as the new zero position for the horizontal axis. If the position and/or the orientation of the rotating laser has changed, the steps of the method for the checking of the horizontal axis must be repeated and the positions where the laser beam strikes the measurement surface must be marked as new control points.

On the LAR-250 rotating laser manufactured by Stabila, the first and second horizontal axes are checked in a joint method for inclination errors. The LAR-250 rotating laser is set up at a measurement distance of 5 m or 10 m from the measurement surface. The rotating laser is oriented in four angular positions one after another that differ from one another by 90°, and the positions where the laser beam strikes the measurement surface are marked as control points on the measurement surface. In the first angular position, the first horizontal axis is oriented on the measurement surface and the laser beam produces a first control point. In the second angular position, the second horizontal axis is oriented on the measurement surface and the laser beam produces a second control point. In the third angular position, the first horizontal axis is oriented opposite to the first angular position on the measurement surface and the laser beam produces the third control point. In the fourth angular position, the second horizontal axis is oriented opposite to the second angular position on the measurement surface and the laser beam produces a fourth control point. The distance between the first and third control points is defined as the first difference and the distance between the second and fourth control point is defined as the second difference. If the first and/or second difference is greater than the maximum difference, the operating instructions specify a calibration of the first and second horizontal axis. The maximum difference is 1 mm at a measurement distance of 5 m, and 2 mm at a measurement distance of 10 m. The calibration of the first horizontal axis is done by means of the first and third control points and the calibration of the second horizontal axis is done by means of the second and fourth control points. The laser plane that is spanned by the rotating laser beam is adjusted by means of the first leveling unit until the laser plane is located in the center between the first and third control points, and by means of the second leveling unit, until the laser plane is located in the center between the second and fourth control points. These positions of the laser plane are stored as new zero positions for the first and second horizontal axes. The center position between the first and third control points corresponds to a new first zero position for the first horizontal axis and the center position between the second and fourth control point corresponds to a new second zero position for the second horizontal axis.

On the Sokkia TRIAX UL-300 the first and second horizontal axes are checked as described above in separate test methods for inclination errors. The rotating laser is set up at a measurement distance of 15 m or 30 m from a measurement surface. In a first test method, the first horizontal axis is checked for a first inclination error and optionally is calibrated in a first calibration method. In a second calibration method, the second horizontal axis is checked for a second inclination error and optionally calibrated in a second calibration method. After the separate verification and calibration methods for the first horizontal axis and the second horizontal axis have been performed, the first and second horizontal axes are compared in a final check of the horizontal axes. For this purpose, the two control points of the first test method for the first horizontal axis and the two control points of the second test process for the second horizontal axis are compared with each other and a maximum distance between the four control points is determined. The maximum separation between the control points is compared with a maximum difference. The maximum difference is 3 mm at a measurement distance of 15 m and 6 mm at a measurement distance of 30 m. When the maximum separation is not greater than the maximum difference, the first and second horizontal axes are within the specified tolerance. The operating instructions for the UL300 do not say what the user has to do if the maximum distance between the four control points is greater than the maximum difference.

On the GR L 500 HV rotating laser manufactured by Bosch Power Tools, the method for the calibration of the horizontal axes differs from the sequence described above in that the control points marked on the measurement surface in the checking process are not referenced for the calibration. The rotating laser is set up at a measurement distance of 30 m from the measurement surface. The first and second horizontal axes are checked for inclination errors as described above by comparing the distance between the two control points with the maximum difference. Bosch Power Tools has specified a maximum difference of 6 mm for the horizontal axes. The method for the calibration of the horizontal axis includes the following steps: the rotating laser is oriented in a first angular position in which the horizontal axis to be calibrated is oriented on the measurement surface. The position in which the laser beam strikes the surface is transferred by means of a laser receiver as a first centerline to the measurement surface. The rotating laser is rotated by 180° into a second angular position in which the horizontal axis to be calibrated is oriented in an opposite axial direction on the measurement surface. The position in which the laser beam strikes the measurement surface is transferred by means of the laser receiver as a second centerline to the measurement surface. The center position between the first centerline and the second centerline is determined by means of the laser receiver. The rotating laser beam is adjusted by means of the leveling device of the rotating laser until the laser beam is located on the center position between the first and second centerlines. The inclination of the laser beam can be adjusted by means of a laser receiver. For this purpose, the center marking of the laser receiver is located above the center position between the first and second centerlines and the inclination of the laser beam is adjusted in the direction of the horizontal axis until the laser plane is located on the center marking of the laser receiver.

The known methods for the checking and/or calibration of a horizontal axis of a rotating laser have the disadvantage that the positions in which the laser beam strike the measurement surface must be manually transferred by the user to the measurement surface and are not suitable for an automated performance of the method. The accuracy of the method it is also a function of the care taken by the user in the determination of the center point of the laser beam, the transfer of the center point to the measurement surface and the determination of the distance between the control points. An additional disadvantage is that the measurement distance between the rotating laser and the measurement surface is specified in a fixed manner for the performance of the method. The measurement distance of 30 m specified for the GRL 500 HV rotating laser manufactured by Bosch Power Tools it is frequently not available for measurement tasks indoors.

EP 2 781 880 A1 describes a method for checking a horizontal plane of a rotating laser and a method for the calibration of the horizontal plane of the rotating laser. The method differs from the sequences described above in that the checking of the horizontal plane of the rotating laser it is not done by checking the first and second horizontal axes but is done in three or any arbitrary number more than three angular positions. For the angular positions of the rotating laser, arbitrary orientations can be selected. The selected angular positions are co-determined on the basis of a direction determination functionality in the framework of the respective method steps. In the method for the checking of the horizontal plane, the rotating laser is manually oriented by the user or automatically by means of a motorized rotating platform into the at least three angular positions and the respective position in which the leveled laser beam strikes a detection field of a laser receiver is stored. EP 2 781 880 A1 does not provide any information how the calibration of the horizontal plane of the rotating laser is done. All it says is that if the requirements are not met or are not fully satisfied, the calibration data stored for the beam horizontal functionality will be automatically updated by the control and evaluation device.

The object of the present invention consists of developing a method for checking and/or calibrating a horizontal axis of a rotating laser with a high degree of accuracy. In addition, the method is to be adaptable to the respective ambient conditions of the measurement environment and be suitable for automated execution.

According to the invention, the method for checking and/or calibrating a first or second horizontal axis of a rotating laser, which projects a first laser beam that is rotatable about an axis of rotation, comprises the following steps:

The rotating laser is positioned at a measurement distance $D_H$ from a laser receiver, wherein the rotating laser is oriented in the horizontal position and the laser receiver is oriented in a longitudinal arrangement, The first and second horizontal axes of the rotating laser are oriented in a horizontal state, wherein the horizontal state is established by a first zero position and the second horizontal axis is established by a second zero position, The rotating laser is arranged in a first angular position, wherein the horizontal axis to be checked is oriented in the first angular position on a detection field of the laser receiver, The incident position of the laser beam on the detection field of the laser receiver is defined as a first control point and the distance of the first control point from a zero position of the detection field is stored as the first height offset $H_1$, The rotating laser is arranged in a second angular position, wherein the second angular position is rotated by 180° to the first angular position about the axis of rotation of the rotating laser, The incident position of the laser beam on the detection field of the laser receiver is defined as the second control point and the distance of the second control point from the zero position of the detection field is stored as a second height offset $H_2$, The distance between the first control point and the second control point is calculated as difference $\Delta$ from the first and second height offsets, The measurement distance $D_H$ between the rotating laser and the laser receiver is determined, and The difference $\Delta$ is compared against a maximum difference $\Delta$max.

In regard to the method according to the invention for checking and/or calibrating a horizontal axis, the measurement distance between the rotating laser and the laser receiver is measured and is not set to a predetermined measurement distance. This has the advantage that the measurement distance can be adapted to the ambient conditions of the measurement environment. In the method according to the invention, the method step in which the measurement distance is determined between the rotating laser and the laser receiver, can be executed at various locations. In the method according to the invention, the incident positions of the laser beam are determined using a laser receiver and stored as height offsets from the zero position of the detection field. By using a laser receiver with a measurement function, the measurement accuracy is increased in executing the method. The laser receiver determines the incident position of the laser beam on the detection field according to a fixed routine.

This has the advantage that the accuracy of the method is independent of the care taken by the operator and is suitable for the automated execution of the method. When the rotating laser is located on a motorized rotating platform, the method according to the invention can be conducted in a fully automated manner In a semi-automatic design, the operator manually places the rotating laser in the first and second angular positions on request; all other method steps are carried out by the rotating laser and laser receiver.

Preferably, the measurement distance between the rotating laser and the laser receiver is determined by means of the rotating laser beam and the laser receiver. The method according to the invention has the advantage that the ambient conditions of the measurement environment can be taken into account when checking and/or calibrating the horizontal axis, and that furthermore no additional device components are required. The measurement distance between the rotating laser and the laser receiver is selected as permitted by the measurement environment.

In a particularly preferred manner, the measurement distance between the rotating laser and the laser receiver is determined as a first distance by means of a first measuring procedure, as a second distance by means of a second measuring procedure, or as a distance averaged from the first and second distances. If the measurement distance between the rotating laser and the laser receiver can be determined by means of various measuring procedures, the method for checking and/or calibrating a horizontal axis can be adapted to the ambient conditions of the measurement environment and the functions of the measuring devices (rotating laser and laser receiver).

In a first preferred embodiment, the measurement distance between the rotating laser and the laser receiver is determined as a first distance by means of the first measuring method. In the first measuring method, the laser beam is inclined by an inclination angle and the distance of the inclined laser beam from the zero position of the detection field is stored. The first measuring method is suited for laser receivers with a measuring function which can measure the distance of a laser beam from a zero position as a height offset. In the method according to the invention, the measurement of the first distance may occur in the first angular position or the second angular position. The inclination of the laser beam by the inclination angle may be accomplished by means of the leveling device of the rotating laser. The leveling device comprises a first leveling unit that orients the first horizontal axis in a first defined state [and] a second leveling unit that orients the second horizontal axis in a second defined state. If the first horizontal axis is checked or calibrated, the first horizontal axis is oriented on the detection field of the laser receiver and the laser beam is inclined by means of the first leveling unit about the second horizontal axis, whereby the adjustment of the angle of inclination is accomplished by means of a first adjustment element and a first inclination sensor of the first leveling unit. When the second horizontal axis is checked or calibrated, the second horizontal axis is oriented on the detection field of the laser receiver and the laser beam is inclined by means of the second leveling unit about the first horizontal axis, wherein the adjustment of the inclination angle occurs by means of a second adjusting element and a second inclination sensor of the second leveling unit.

In a first variant of the first measuring procedure, the rotating laser is oriented horizontally, the horizontally oriented laser beam is set to the zero position of the detection field, the laser beam is inclined toward the laser receiver by an inclination angle $\alpha$, the incident position of the inclined laser beam on the detection field of the laser receiver is determined as a first measuring point, the distance of the first measuring point from the zero position of the detection field is stored as first height $h_1=h(\alpha)$ and the first distance $d_1$ is calculated from the inclination angle $\alpha$ and a height difference $\Delta h$ between the first height $h_1$ and the zero position of the detection field. When the longitudinal direction of the laser receiver is oriented parallel to the direction of gravity, the first distance $d_1$ can be calculated according to the formula $\tan(\alpha)=\Delta h/d_1$. For small inclination angles $\alpha$, $\tan(\alpha)\approx\sin(\alpha)$ approximately. The first variant of the first measuring procedure is particularly suited for rotating lasers and laser receivers with an auto-alignment function, in which the height adjustment of the laser beam to the zero position of the detection field of the laser receiver can be performed automatically.

In a second variant of the first measuring procedure, the rotating laser is oriented horizontally, the incident position of the horizontally oriented laser beam on the detection field of the laser receiver is determined as a reference point, the distance of the reference point from the zero position of the detection field is stored as reference height $h_0=h(0°)$, the laser beam is inclined by inclination angle $\alpha$, the incident position of the inclined laser beam on the detection field is determined as a first measuring point, the distance of the first measuring point from the zero position of the detection field is stored as first height $h_1=h(\alpha)$ and the first distance $d_1$ is calculated from the inclination angle $\alpha$ and a height difference $\Delta h$ between the first height and the reference height. When the longitudinal direction of the laser receiver is oriented parallel to the direction of gravity, the first distance $d_1$ can be calculated according to the formula $\tan(\alpha)=(h_1-h_0)/d_1=\Delta h/d_1$. For small inclination angles $\alpha$, $\tan(\alpha)\approx\sin(\alpha)$ approximately. The second variant of the first measuring procedure is suited for rotating lasers and laser receivers without an auto-alignment function. The operator must only ensure that the laser beam inclined at inclination angle $\alpha$ is captured by the detection field of the laser receiver. For a rotating laser and laser receiver with an auto-alignment function, the laser beam is automatically moved into the area of the detection field.

In a third variant of the first measuring procedure, the rotating laser is oriented horizontally, the horizontally oriented laser beam is inclined in an inclination direction by inclination angle $\alpha$, the incident position of the inclined laser beam on the detection field of the laser receiver is determined as the first measuring point, the distance of the first measuring point to the zero position of the detection field is stored as first height $h_1=h(\alpha)$, the laser beam is inclined in an opposing inclination direction by a negative inclination angle $-\alpha$, the incident position of the inclined laser beam on the detection field is determined as the second measuring point, the distance of the second measuring point from the zero position of the detection field is stored as second height $h_2=h(-\alpha)$ and the first distance $d_1$ is calculated from the inclination angle $\alpha$ and a height difference $\Delta h$ between the first height and the second height. When the longitudinal direction of the laser receiver is oriented parallel to the direction of gravity, the first distance $d_1$ can be calculated according to the formula $\tan(2\alpha)=(h(\alpha)-h(-\alpha))/d_1=\Delta h/d_1$. For small inclination angles $\alpha$, $\tan(2\alpha)\approx\sin(2\alpha)$ approximately. The third variant of the first measuring procedure is suitable for rotating lasers and laser receivers with and without an auto-alignment function. When the laser beam is initially oriented to the zero position of the detection field or at least in the vicinity of the zero position, the entire detection height of the detection field can be used. For a device system with an auto-alignment function, the adjustment to the zero position can be performed automatically.

In a second preferred embodiment, the measurement distance between the rotation laser and the laser receiver is determined as the second distance by means of the second measuring procedure. In the second measuring procedure, the rotating laser is oriented horizontally, the laser beam is moved at a known speed $v_R$ around the axis of rotation, the signal length $t_s$ of the laser beam on the detection field of the laser receiver is determined and the second distance $d_2$ is calculated from the speed of rotation $v_R$, signal length $t_s$ and detection width $B_D$ of the detection field. When the longitudinal direction of the laser receiver is oriented parallel to the direction of gravity, the second distance $d_2$ can be calculated according to the formula $t_s/t_{full}=B_D/(2\pi d_2)$, where $t_{full}=60/v_R$. The speed of rotation $v_R$ is indicated in revolutions per minute and time $t_{full}$ required for one revolution is $60/v_R$. The second measuring procedure is suitable for rotation lasers and laser receivers without an auto-alignment function. The laser receiver must be able to measure signal length $t_s$ of the laser beam on the detection field.

In a third preferred embodiment, the measurement distance between the rotating laser and the laser receiver is determined as the distance averaged from the first and second distances. By averaging the first and second distances, the accuracy with which the measurement distance between the rotating laser and the laser receiver can be determined can be increased. The first distance, which is determined using the first measuring procedure, is greater than or equal to the actual measurement distance. When the transverse direction of the laser receiver is not oriented parallel to the direction of gravity but is inclined in relation to the direction of gravity, the horizontal distance perpendicular to the direction of gravity is less than the distance the detection field of the laser receiver measured. The second distance, which is determined using the second measuring procedure, is less than or equal to the actual measurement distance. When the longitudinal direction of the laser receiver is not oriented parallel to the direction of gravity but is inclined in relation to the direction of gravity, the horizontal distance in the direction of gravity the laser beam passes over on the detection field, is greater than detection width $B_D$ of the detection field.

In a preferred development of the method, an inclination of the laser receiver relative to a direction of gravity is determined as a first vertical angle $\varphi_1$ in a first vertical plane and/or as a second vertical angle $\varphi_2$ in a second vertical plane, wherein the first vertical plane is spanned by the direction of gravity and a perpendicular vector of the detection field of the laser receiver and the second vertical plane is spanned by a longitudinal direction and a transverse direction of the detection field. The first vertical angle $\varphi_1$ is measured between the perpendicular vector of the detection field and the direction of gravity, wherein the first vertical angle $\varphi_1$ represents the deviation of 90° between the perpendicular vector and the direction of gravity, and the second vertical angle $\varphi_2$ is measured between the direction of gravity and the longitudinal direction of the detection field. In executing the method according to the invention, the laser receiver is oriented in a longitudinal arrangement, wherein the longitudinal direction of the detection field should run perpendicular to the direction of gravity and the transverse direction of the detection field should run parallel to the direction of gravity. By inclining the laser receiver relative to the direction of gravity, the horizontal and vertical distances deviate from the distances that the detection field of the laser receiver measured. If the inclination of the laser receiver is known, the dimensions can be corrected accordingly. The laser receiver may be inclined relative to the direction of gravity by the first and/or second vertical angle. The inclination of the laser receiver can be measured by means of a 2-axis acceleration sensor or by means of two 1-axis acceleration sensors.

In a particularly preferred manner, in the evaluation with the laser receiver for the first vertical angle $\varphi_1$ and/or the second vertical angle $\varphi_2$, an angle-dependent correction factor $\cos(\varphi_1)$, $\cos(\varphi_2)$, $1/\cos(\varphi_2)$ is multiplied. By the multiplication with an angle-dependent correction factor or with a plurality of angle-dependent correction factors, the inclination of the laser receiver can be compensated by the first vertical angle $\varphi_1$ and/or the second vertical angle $\varphi_2$. In the formulas that use the measuring function of the laser receiver and measure distances on the detection field in the longitudinal direction, the distances are multiplied by a correction factor $\cos(\varphi_1)$ for the first vertical angle $\varphi_1$ and a correction factor $\cos(\varphi_2)$ for the second vertical angle $\varphi_2$. The correction factor $\cos(\varphi_1) \cdot \cos(\varphi_2)$ is to be taken into account in the distance measurement of the measurement distance using the first measuring procedure, in determining the difference between the first and second control points, and calculating the correction angle within the scope of the method according to the invention. In regard to the distance measurement of measurement distance $D_H$ as the second distance using the second measuring procedure, the conventional measuring function of the laser receiver in the longitudinal direction is not used, but the detection width in the transverse direction. By inclining the laser receiver in the second vertical plane by second vertical angle $\varphi_2$, the horizontal distance that the laser beam passes over in the detection field is greater than the detection width $B_D$ of the detection field. The signal length of the rotating laser beam corresponds to the horizontal distance on the detection field. For the horizontal distance, the correlation $B_D/\cos(\varphi_2)$ applies. An inclination of the laser receiver by the first vertical angle $\varphi1$ does not change the horizontal distance. The angle-dependent correction factor $1/\cos(\varphi_2)$ is taken into account in the distance measurement using the second measuring procedure.

In a preferred development of the method, for orienting the horizontal to be checked in the horizontal state, a plurality of zero positions are recorded as a function of a temperature or a temperature-dependent measured value and stored in a characteristic curve. The term "characteristic curve" thereby comprises both a continuous characteristic curve as well as a table with discrete value pairs of zero positions and temperatures, or of zero positions and temperature-dependent measured values. The stored characteristic curve represents for the horizontal axis of the rotating laser to be checked a correlation between the temperature and the temperature-dependent measured value and the zero position of the inclination sensor. The inclination angle that corresponds to the defined state of the horizontal axis is defined as the zero position. From the characteristic curve, a zero position can be read for every temperature from the approved operating temperature range.

Preferably, the temperature or the temperature-dependent measured variable of the rotating laser is measured, the zero position associated with the temperature or measured value is determined from the characteristic curve, and the horizontal axis is oriented in the state defined by the zero position. By means of the temperature measurement, it is possible to increase the device accuracy of the rotating laser, since the influence of the temperature on the device accuracy of the rotating laser is reduced.

In a particularly preferred manner, the temperature of the rotating laser is measured by means of an inclination sensor, which comprises a housing that is filled with a liquid and a gas bubble, a light source and at least one photo detector. The measurement of the temperature of the rotating laser by means of the inclination sensor of the leveling unit has the advantage that the temperature is measured exactly at the location in the device housing of the rotating laser that is relevant for orienting the horizontal axis. In addition, no additional sensor element is required for temperature measurement, so that the equipment cost for the temperature measurement is reduced.

In a particularly preferred manner, an additional characteristic curve of temperatures and bubble lengths of the gas bubble is stored, the bubble length of the gas bubble is measured using the light source and the photo detector of the inclination sensor, and the temperature associated with the measured bubble length is determined using the additional characteristic curve. The gas bubble of the inclination sensor has a bubble length that is temperature-dependent and is thus suitable as a measured variable for the temperature. The bubble length can be measured using the light source and the photo detector of the inclination sensor. For the temperature measurement, no additional sensor element is required; the temperature is measured solely using the components of the inclination sensor.

In a preferred manner, a correction angle $\theta$ is calculated from the measurement distance $D_H$, the first height offset $H_1$ and the second height offset $H_2$, and the correction angle $\theta$ is stored as the new zero position for orienting the horizontal axis in the horizontal state when the difference $\Delta$ is greater than the maximum difference $\Delta_{max}$. The measurement distance $D_H$ between the rotating laser and the laser receiver was determined as a first distance, as a second distance or as an averaged distance, and is required for calibrating the horizontal axis. If the difference $\Delta$ between the first and second control points is greater than the maximum difference $\Delta$max defined by the device manufacturer, the rotating laser does not meet the indicated device accuracy and the horizontal axis must be calibrated. The correction angle $\theta$ may be calculated according to the formula $\tan(\theta)=(H_1-H_2)/2D_H$.

In a particularly preferred manner, the calibrated horizontal axis is checked in an additional check loop, wherein the horizontal state of the horizontal axis is defined by the new zero position. The device axes are oriented in the horizontal state and the method for checking the horizontal axis is carried out. The distance between the first control point, which is determined in the first angular position, and the second control point, which is determined in the second angular position, is calculated as difference $\Delta$ and compared against the maximum difference $\Delta_{max}$. When the difference $\Delta$ is less than the maximum difference $\Delta_{max}$, the rotating laser meets the specified accuracy. In the event that the difference $\Delta$ is greater than the maximum difference $\Delta_{max}$ or equal to the maximum difference $\Delta_{max}$, an adjustment of the rotating laser is necessary.

Embodiments of the invention are described below with reference to the accompanying drawing. The intention is not necessarily to depict the embodiments to scale; rather, the drawing, where useful for the sake of explanation, is drawn in a schematic and/or slightly distorted form. It should thereby be taken into account that diverse modifications and changes pertaining to the form and detail of a design may be undertaken without departing from the general idea of the invention. The general idea of the invention is not restricted to the exact form or detail of the preferred design shown and described below or restricted to a subject matter that would be restricted in comparison to the subject matter claimed in the claims. In regard to provided measurement ranges, values lying within the mentioned limits shall be disclosed as limit values and be arbitrarily usable and claimable. For the sake of simplicity, the same reference numbers are used below for identical or similar parts, or parts with identical or similar functions.

DETAILED DESCRIPTION OF THE DRAWINGS

Figure 1:
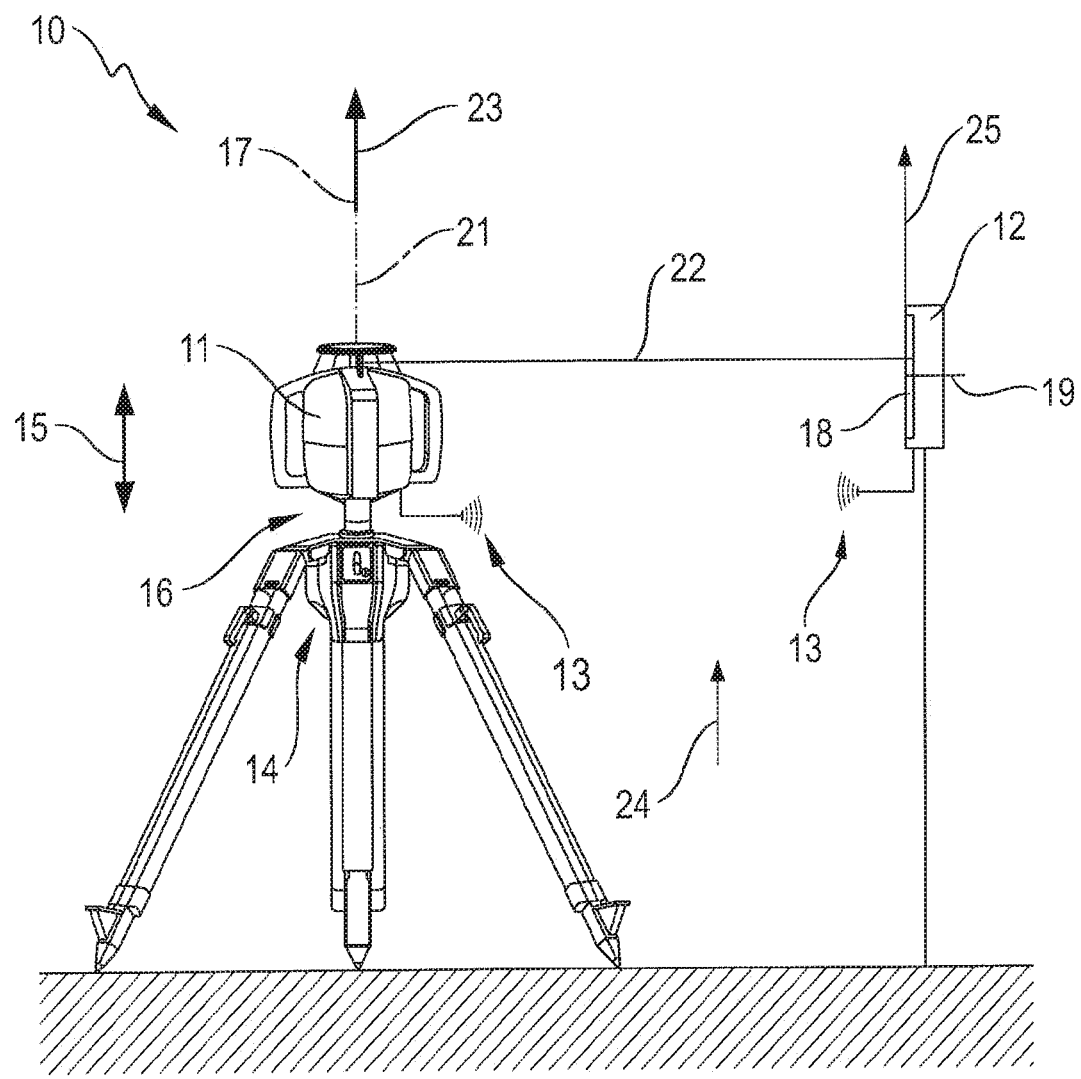
FIG. 1 illustrates a device with a rotating laser in a horizontal position and a laser receiver in a longitudinal arrangement.

FIG. 1 depicts a device 10 with a rotating laser 11 and a laser receiver 12, which can be connected via a wireless communications link 13. The rotating laser 11 is oriented in a horizontal position that is provided for horizontal applications of the rotating laser. The rotating laser 11 is located on a motorized tripod 14 that allows an automatic height adjustment of rotating laser 11 in a height direction 15. In addition, a rotating platform 16 may be provided, which allows an automatic angle adjustment of rotating laser 11 about an axis of rotation 17 of the rotating platform 16. The rotating platform 16 can be integrated in the tripod 14 or be designed as a separate component that is arranged on the tripod 14.

The laser receiver 12 is provided with a measuring function, which determines an incident position of a laser beam on a detection field 18 of laser receiver 12 and represents the distance of the laser beam to a zero position 19 of detection field 18.

The rotating laser 11 is designed as a horizontally and vertically usable rotating laser, which has a first laser beam 22 rotating about an axis of rotation 21 of rotating laser 11 and a stationary second laser beam 23. Rotating first laser beam 22 produces a laser plane, which is oriented perpendicular to axis of rotation 21, and second laser beam 23 runs perpendicular to the laser plane of first laser beam 22. The horizontal position of rotating laser 11 shown in FIG. 1 utilizes second laser beam 23 and the beam is oriented toward the detection field 18 of laser receiver 12, wherein laser receiver 12 is oriented in a longitudinal arrangement.

The orientation of laser receiver 12 is defined by means of detection field 18 and a direction of gravity 24. Detection field 18 of laser receiver 12, with which the incident position of the first or second laser beam 22, 23 is captured, has in a longitudinal direction 25 a detection height $H_D$ and in a transverse direction 26 a detection width $B_D$. Longitudinal direction 25 corresponds to the measuring direction of laser receiver 12 and transverse direction 26 is oriented perpendicular to longitudinal direction 25, wherein the longitudinal and transverse directions 25, 26 run parallel to a top side of detection field 18. The longitudinal arrangement refers to the orientation of laser receiver 12, in which the longitudinal direction 25 of detection field 18 is oriented parallel to direction of gravity 24, and the transverse arrangement refers to the orientation of laser receiver 12, in which transverse direction 26 of detection field 18 is oriented parallel to direction of gravity 24.

Figure 2A:
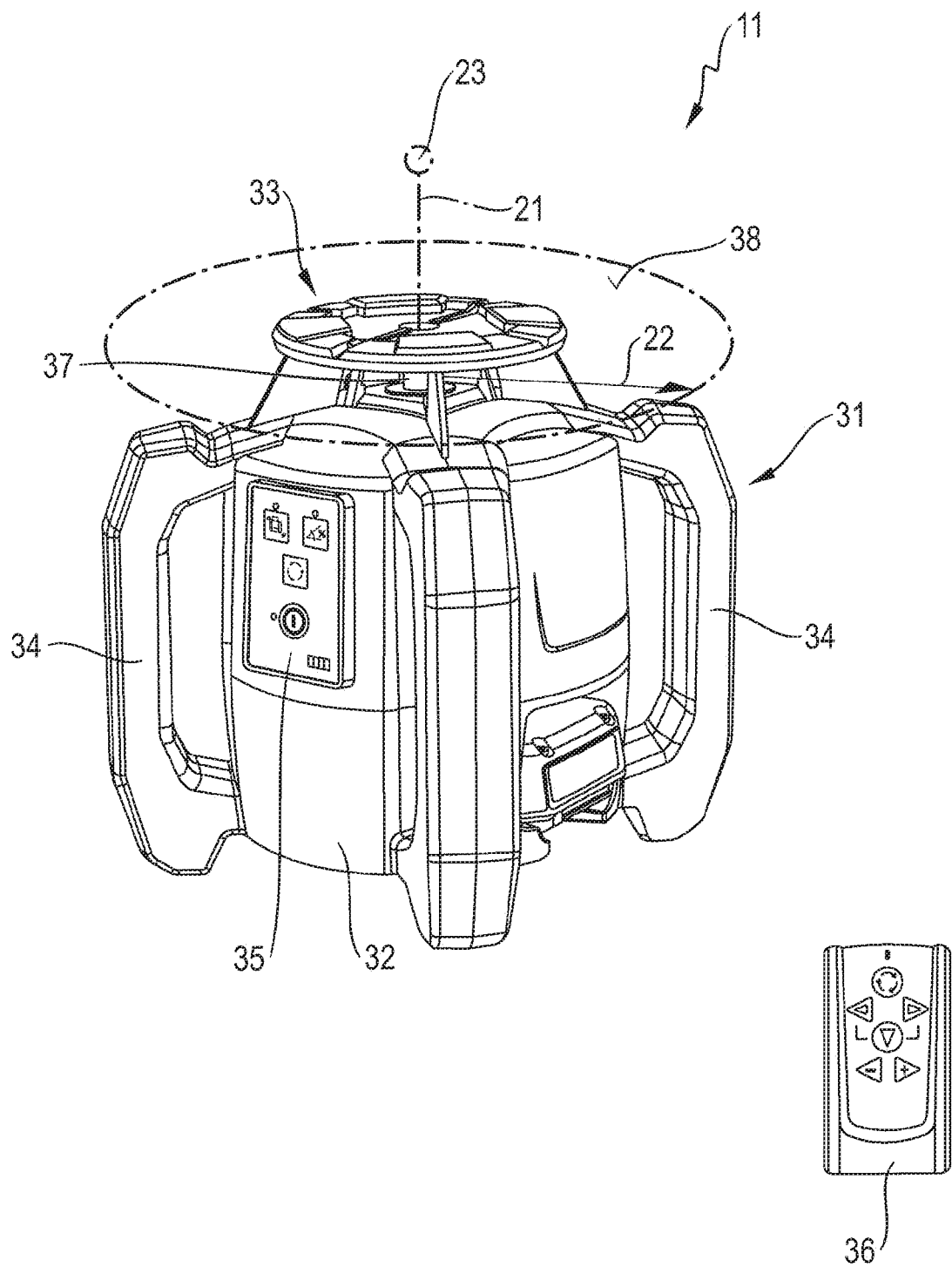
FIGS. 2A-C illustrate the rotating laser of FIG. 1 in a three-dimensional depiction (FIG. 2A) and the main components of the rotating laser in a schematic illustration in a vertical plane (FIG. 2B) and a horizontal plane (FIG. 2C)
Figure 2B:
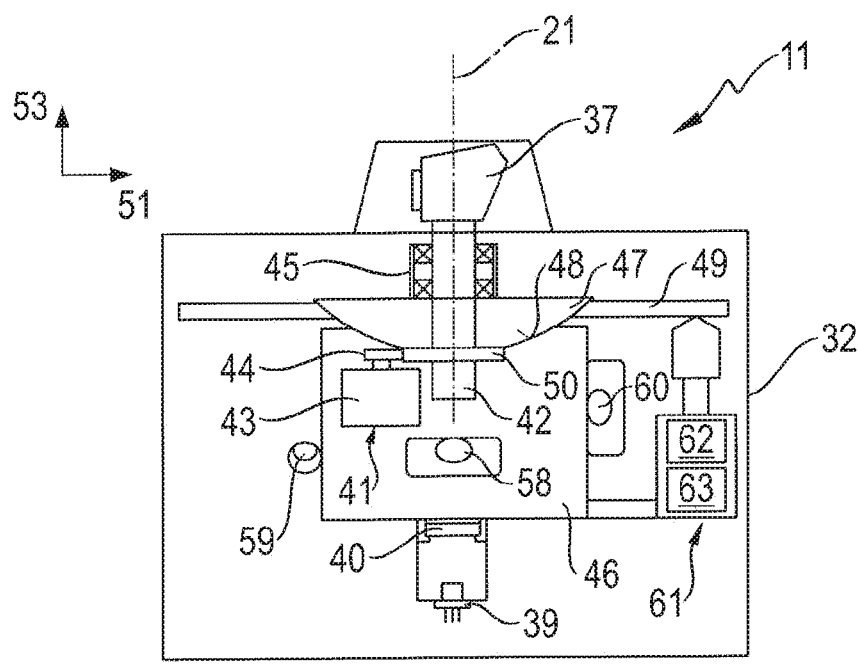
Figure 2C:
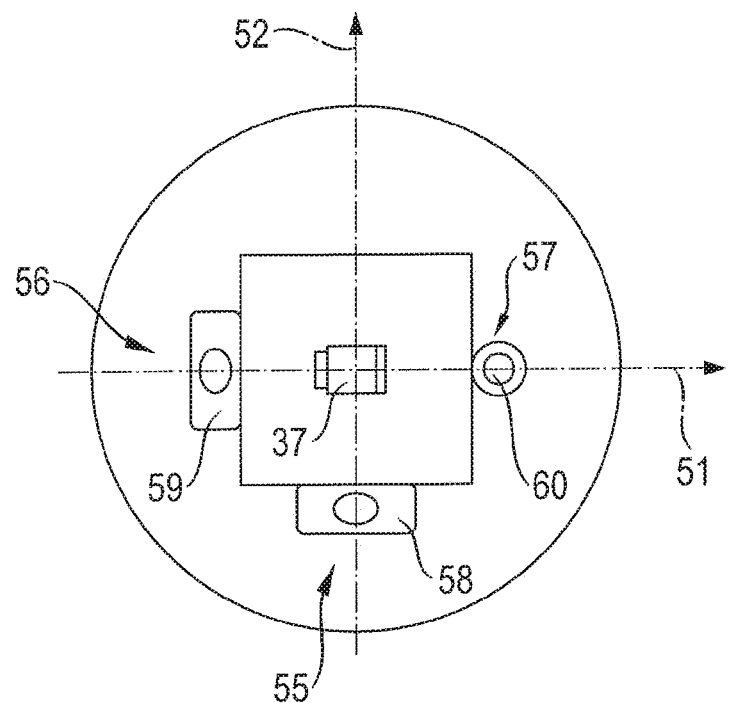

FIGS. 2A-C depict rotating laser 11 in a three-dimensional illustration in a three-dimensional illustration (FIG. 2A) and the main components of rotating laser 11 in a schematic illustration, wherein FIG. 2B illustrates the components in a vertical plane parallel to rotation axis 21, and FIG. 2C illustrates the components in a horizontal plane perpendicular to rotation axis 21.

Rotating laser 11 comprises a device housing 31 and a measuring device arranged in unit housing 31. Unit housing 31 consists of a basic housing 32, a rotation head 33 and a plurality of handles 34. Rotating laser 11 is operated via an operating device 35, which is integrated in basic housing 32 and operable from the outside. Besides operating device 35 integrated into the basic housing 32, a remote control 36 may be provided, which can be connected to rotating laser 11 via a communications link. The measuring device of rotating laser 11 produces within basic housing 32 a laser beam, which strikes deflection lens 37 rotating about axis of rotation 21. A first part of the laser beam is deflected 90° by deflection lens 37 and forms first laser beam 22 of rotating laser 11, which spans a laser plane 38. A second part of the laser beam passes through deflection lens 37 and forms second laser beam 23 of rotating laser 11. A rotation mode, a line mode, and a point mode of rotating laser 11 are differentiated depending on the rotation speed at which first laser beam 22 is rotated about rotation axis 21.

FIGS. 2B, C depict the main components of rotating laser 11 in a schematic illustration. Rotating laser 11 comprises a laser device with a beam source 39, which produces a laser beam, and collimation lens 40. Beam source 39 is designed as a semiconductor laser for example, which produces the laser beam in the visible wavelength spectrum, for example a red laser beam having a wavelength of 635 nm or a green laser beam having a wavelength of 532 nm. After the laser beam leaves beam source 39, the laser beam is collimated using the collimation lens 40. Alternatively, the collimation lens may be integrated in the beam source, or for a beam source 39 having a high beam-quality and little divergence, the collimation lens may be omitted.

The collimated laser beam strikes deflection lens 37, which separates the first and second laser beams 22, 23. Deflection lens 37 is connected to a rotation device 41, which moves deflection lens 37 about axis of rotation 21. Rotation device 41 comprises a rotatable shaft 42, a motor unit 43, and a transmission device 44, which is designed in the form of a toothed belt and transmits the movement of motor unit 43 to shaft 42. Deflection lens 37 is coupled to rotatable shaft 42 and is designed to be rotatable about axis of rotation 21. Shaft 42 is seated in a pivot bearing 45 of a stator element 46, which is connected to a spherical cap 47.

Spherical cap 47 is seated in a manner where it can be inclined about two pivot planes perpendicular to two rotation planes (plane perpendicular to axis of rotation 21) in a spherical cap bearing 48 in an installation frame 49 fastened to the housing. Rotating laser 11 comprises a measuring device 50, which measures the angle of rotation of shaft 42 during the rotation about axis of rotation 21. Measuring device 50 is designed for example as an angle encoder and consists of a graduated wheel that is non-rotationally connected to shaft 42, a scanning device with which the measuring disk is scanned, and an evaluation and control element.

Rotating laser 11 is designed as a horizontally and vertically usable rotating laser, wherein a horizontally and vertically usable rotating laser differs from a horizontally usable rotating laser due to an additional device axis. Rotating laser 11 has as device axes a first horizontal axis 51 and a second horizontal axis 52, which run perpendicular to each other and span a device plane. The first and second horizontal axes 51, 52 are displayed on rotation head 33 of rotating laser 11 via display elements. The horizontally and vertically usable rotating laser 11 has, besides the first and second horizontal axes 51, 52, an additional device axis, which is referred to as vertical axis 53 and is ideally oriented perpendicular to the device plane of the first and second horizontal axes 51, 52.

Rotating laser 11 is designed as a self-leveling rotating laser, which levels itself automatically when device housing 31 of rotating laser 11 is set up within a self-leveling range. The self-leveling range of rotating lasers is typically 5°. Rotating laser 11 comprises a leveling device, which orients the device axes of rotating laser 11 independently of an orientation of device housing 31 in a defined state. The leveling device comprises a first leveling unit 55 that orients first horizontal axis 51 in a first defined state, a second leveling unit 56 that orients second horizontal axis 52 in a second defined state, and a third leveling unit 57 that orients vertical axis 53 in a third defined state.

First leveling unit 55 comprises a first inclination sensor 58 and a first adjustment element, second leveling unit 56 comprises a second inclination sensor 59 and a second adjustment element, and third leveling unit 57 comprises a third inclination sensor 60 and a third adjustment element. The adjustment elements of leveling units 55, 56, 57 are integrated into inclination device 61, which has a first adjustment motor 62 and a second adjustment motor 63. First adjustment motor 62 inclines mounting frame 49 about a first pivot axis, which coincides with second horizontal axis 52, and the second adjustment motor 63 inclines mounting frame 49 about a second pivot axis, which coincides with first horizontal axis 51. First adjustment motor 62 forms the first adjustment element of first leveling unit 55 and second adjustment motor 63 forms the second adjustment element of second leveling unit 56. Since vertical axis 53 is oriented perpendicular to the horizontal plane of first and second horizontal axes 51, 52, the orientation of vertical axis 53 can be adjusted by means of first and second adjustment motors 62, 63. First and second adjustment motors 62, 63 jointly form the third adjustment element of third leveling unit 57.

The horizontal orientation of the laser plane or the device plane represents a preferred defined state, in which a rotating laser 11 is to be oriented in a horizontal position, wherein the horizontally oriented device plane is also referred to as a horizontal plane. The vertical orientation of the laser plane or the device plane represents a preferred defined state, in which a rotating laser 11 is to be oriented in a vertical position, wherein the vertically oriented device plane is also referred to as a vertical plane. Laser plane 38, which produces rotating first laser beam 22, can be inclined by means of inclination device 61 in relation to the horizontal plane or the vertical plane of rotating laser 11. Rotating laser 11 can incline the laser plane of rotating first laser beam 22 in one inclination direction or in two inclination directions. The inclination of the laser plane occurs in a leveled stated of rotating laser 11. Rotating laser 11 can be inclined in a horizontal position or in a vertical position.

Figure 3A:
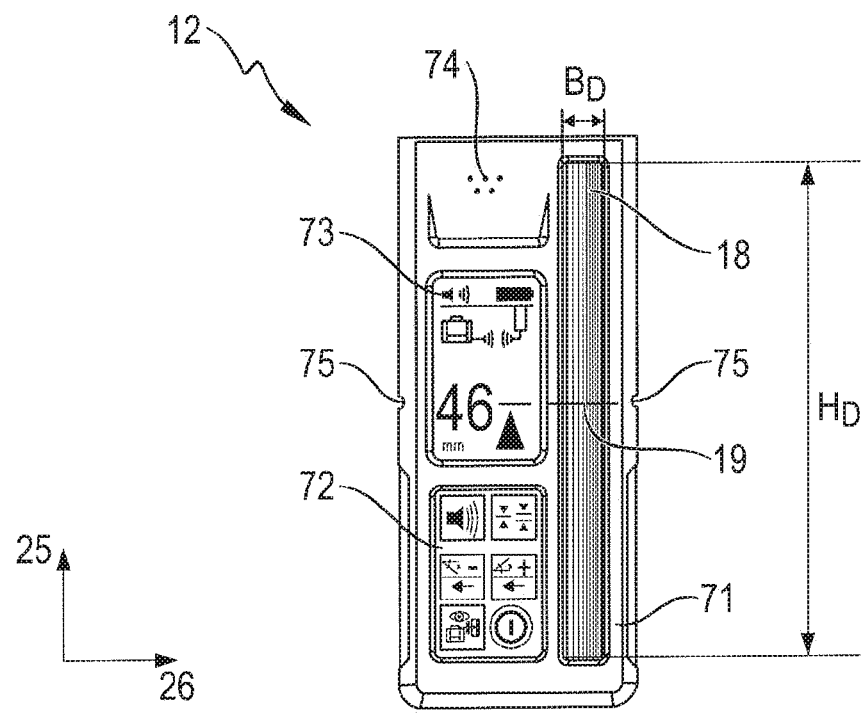
FIGS. 3A, B illustrate the laser receiver of FIG. 1 in a three-dimensional illustration (FIG. 3A) and the main components of the laser receiver and the rotating laser in a schematic illustration (FIG. 3B)
Figure 3B:
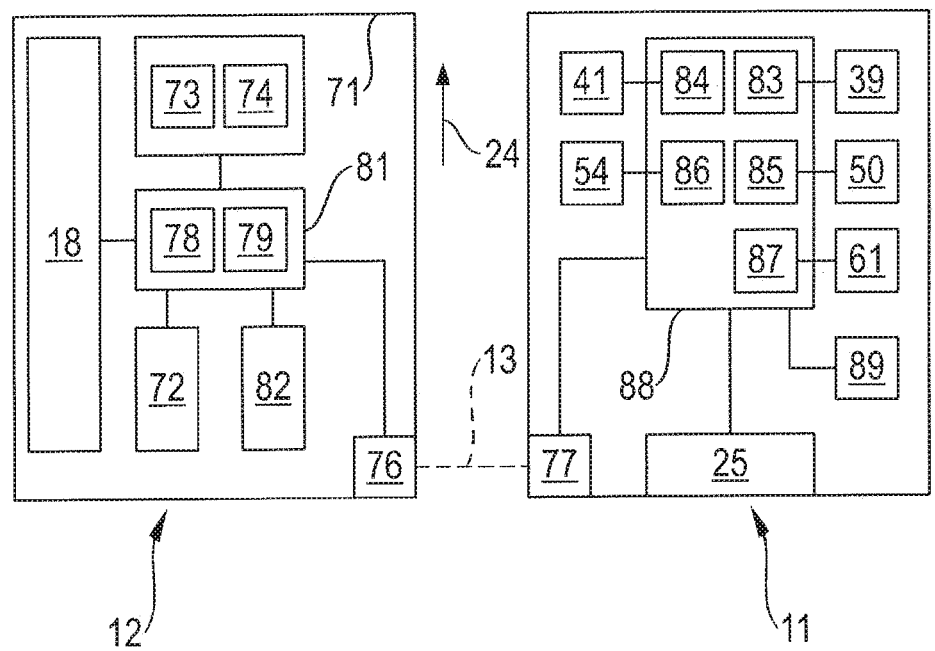

FIGS. 3A, B depict laser receiver 12 in a three-dimensional illustration (FIG. 3A) and the main components of laser receiver 12 as well as the interaction with rotating laser 11 in a schematic illustration (FIG. 3B). Laser receiver 12 is provided with a measuring function, which determines the distance of a laser beam from zero position 19 of detection field 18.

Laser receiver 12 comprises a receiver housing 71, an operating device 72, a visual display 73, a speaker 74 and detection field 18, with which the incident position of a laser beam is captured. Detection field 18 has detection height $H_D$ in longitudinal direction 25 and detection width $B_D$ in transverse direction 26. Longitudinal direction 25 corresponds to the measuring direction of laser receiver 12 and transverse direction 26 is oriented perpendicular to longitudinal direction 25, wherein the longitudinal and transverse directions 25, 26 run parallel to detection field 18.

Operating device 72, optical display 73, speaker 74 and detection field 18 are integrated into receiver housing 71 of laser receiver 12. The operator can read information about laser receiver 12 via the visual display 73. This information includes for example a charge state of laser receiver 12, information about wireless communications link 13 to a rotating laser 11, and the adjusted volume of speaker 74. In addition, the distance of a laser beam from zero position 19 of laser receiver 12 can be indicated as a numerical value. As an alternative or in addition to the visual indication on visual display 73, the distance of the laser beam can be reported via speaker 74. Zero position 19 of detection field 18 is indicated on receiver housing 71 via marking notches 75.

FIG. 3B depicts the main components of laser receiver 12 and the interaction of laser receiver 12 with rotating laser 11 in the form of a block diagram. Communication between laser receiver 12 and rotating laser 11 occurs via communications link 13, which connects a first transmit/receive unit 76 in laser receiver 12 with a second transmitter/receiver unit 77 in rotating laser 11. First and second transmitter/receiver units 76, 77 are designed for example as radio modules and the communication between laser receiver 12 and rotating laser 11 occurs via a communications link 13 designed as a radio link.

Detection field 18, visual display 73 and speaker 74 are connected to an evaluation device 78, which is arranged inside receiver housing 71. Evaluation device 78 is connected to a control device 79 to control laser receiver 12, wherein evaluation device 78 and control device 79 are integrated in a control device 81 designed for example as a microcontroller. Laser receiver 12 also comprises a sensor module 82, which is arranged inside receiver housing 71 and is connected to control device 81. Using sensor module 82, an inclination of laser receiver 12 relative to direction of gravity 24 can be measured. Sensor module 82 comprises a 2-axis acceleration sensor or two 1-axle acceleration sensors.

The components of rotating laser 11, which are controlled by means of control elements or are connected to an evaluation element, include beam source 39, rotation device 41, measuring device 50 as well as leveling device 54, and the inclination device 61, if one is present. A first control element 83 for controlling beam source 39, a second control element 84 for controlling rotation device 41, an evaluation and control element 85 for measuring device 50, a third control element 86 for controlling leveling device 54 and a fourth control element 87 for controlling inclination device 61 can be designed as separate components, or as illustrated in FIG. 3B they can be integrated in a common control device 88, which is designed as a microcontroller for example. The control elements are connected via communication links to the components to be controlled of rotating laser 11.

Rotating laser 11 also comprises a temperature sensor 89, which is arranged in unit housing 31 of rotating laser 11. Temperature sensor 89 measures the temperature in unit housing 31 and transmits the temperature to control device 89 of rotating laser 11. Since the orientation of inclination sensors 58, 59, which orient first and second horizontal axes 51, 52 of rotating laser 11 in the horizontal state, are temperature-dependent and rotating laser 11 can be utilized in a broad temperature range, for example between −20° C. and +50° C., it is advantageous if a plurality of zero positions v are stored in control device 88 of rotating laser 11. To do so, multiple first zero positions $v_1$ can be entered for first inclination sensor 58 as a function of the temperature and stored in a characteristic curve or table, a plurality of second zero positions $v_2$ can be entered for second inclination sensor 59 as a function of the temperature and stored in a characteristic curve or table. The zero position associated with the measured temperature is read from the characteristic curve or table, and the horizontal device axis is oriented in the horizontal state defined by the zero position.

Figure 4A:
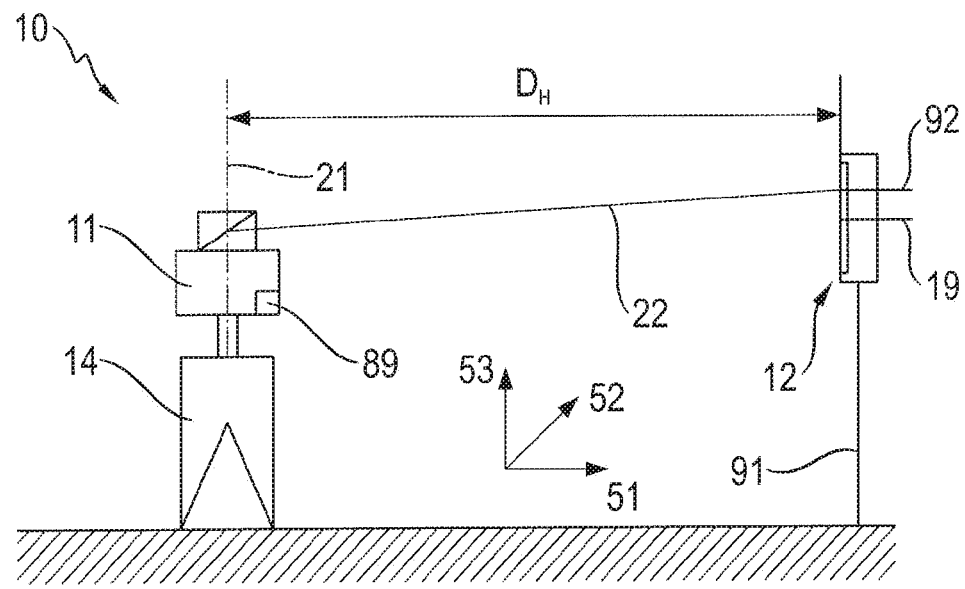
FIG. 4A-C illustrate the rotating laser and the laser receiver of FIG. 1 in the embodiment of the method according to the invention for checking and calibrating a horizontal axis of the rotating laser.
Figure 4B:
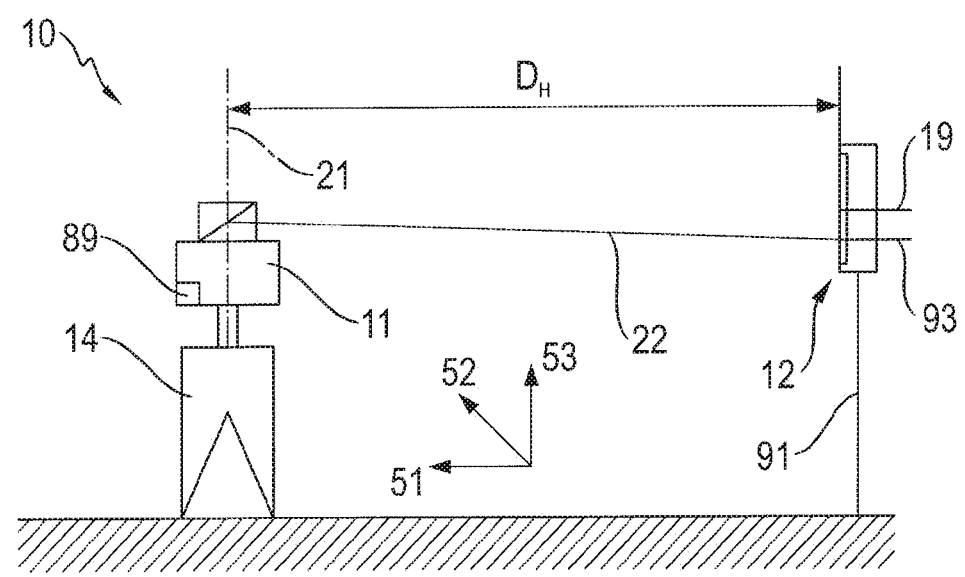
Figure 4C:
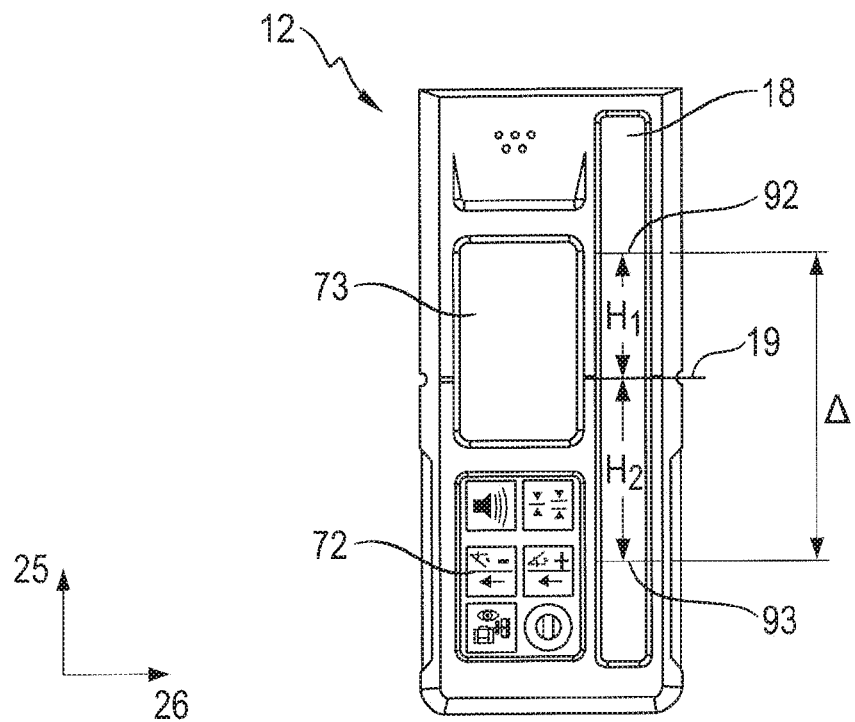

FIGS. 4A-C depict device 10 of FIG. 1 with rotating laser 11 and laser receiver 12 while executing the method according to the invention for checking and/or calibrating a horizontal axis 51, 52 of rotating laser 11, whereby the method is described on the basis of the first horizontal axis 51. FIG. 4A depicts rotating laser 11 in a first angular position, in which the first horizontal axis 51 to be checked is oriented toward laser receiver 12; FIG. 4B depicts rotating laser 11 in a second angular position, in which the first horizontal axis 51 to be checked is oriented in an axial direction opposite to the first angular position on the laser receiver 12, and FIG. 4C depicts laser receiver 12 with the incident position of second laser beam 22 in the first and second angular positions. To check the second horizontal axis 52 for inclination errors and calibrate it is necessary, the second horizontal axis 52 is oriented in both axial directions on the laser receiver 12.

The method according to the invention for checking and/or calibrating a horizontal axis is executed in a horizontal position of rotating laser 11 and in a longitudinal arrangement of laser receiver 12. Rotating laser 11 is set up in a horizontal position on tripod 14 or on a stable substrate at a measurement distance $D_H$ from laser receiver 12, wherein measuring distance $D_H$ is measured between the center of deflection lens 37 of rotating laser 11 and the top side of detection field 18 of laser receiver 12. Using tripod 14 has the advantage that the method according to the invention is executed at a height at which temperature fluctuations are less than on the ground. Laser receiver 12 is attached to a stationary wall, a mobile wall or a measuring staff 91.

To adjust the horizontal position of rotating laser 11, the first and second horizontal axes 51 and 52 are oriented in a horizontal state, wherein the horizontal state of first horizontal axis 51 is established by a first zero position $v_1$ of first inclination sensor 58 and the horizontal state of second horizontal axis 52 by a second zero position $v_2$ of second inclination sensor 59. First horizontal axis 51 is oriented by means of first leveling unit 55 in first zero position $v_1$ and the second horizontal axis 52 is oriented by means of second leveling unit 56 in second zero position $v_2$. Stored in control device 89 of rotating laser 11 are first zero position $v_1$ for first inclination sensor 58 and second zero position $v_2$ for second inclination sensor 59.

To check the first horizontal axis 51, rotating laser 11 is arranged consecutively in a first and second angular position, which differ from each other by 180°. Rotating laser 11 can be oriented into the angular positions using rotation platform 16 or manually by the operator. Rotating laser 11 is arranged in the first angular position (FIG. 4A), wherein the first horizontal axis 51 is oriented in the first angular position toward detection field 18 of laser receiver 12. The incident position of the first laser beam 22 on detection field 18 of laser receiver 12 is determined by evaluation device 78 of laser receiver 12 as a first control point 92, and the distance of first control point 92 from zero position 19 of detection field 18 is stored as first height offset $H_1$ (FIG. 4C). Rotating laser 11 is oriented out of the first angular position by 180° about axis of rotation 21 into the second angular position (FIG. 4B). In the second angular position, the first horizontal axis 51 to be checked is oriented in the opposite axis direction toward detection field 18 of laser receiver 12. The incident position of first laser beam 22 on detection field 18 of laser receiver 12 is determined by evaluation device 78 of laser receiver 12 as a second control point 93, and the distance of second control point 93 from zero position 19 of detection field 18 is stored as second height offset $H_2$ (FIG. 4C).

Evaluation device 78 of laser receiver 12 calculates the distance between first control point 92 and second control point 93 as difference $\Delta$ from first and second height offsets $H_1$, $H_2$. As described, the evaluation can be performed by evaluation device 78 of laser receiver 12. Alternatively, the evaluation can be performed by a corresponding component in rotating laser 11 or an additional component. If the evaluation is not performed by evaluation device 78 of laser receiver 12, first and second control points 92, 93 or difference $\Delta$ are transmitted via a communications link to the corresponding component.

Evaluation device 78 of laser receiver 12 calculates from difference $\Delta = H_1 - H_2$ and measurement distance $D_H$ between rotating laser 11 and laser receiver 12 a relative deviation $\Delta/D_H$ and compares the relative deviation $\Delta/D_H$ against an established relative maximum deviation $\Delta_{max}/D_H$. Alternatively, from the relative maximum deviation $\Delta_{max}/D_H$ and measuring distance $D_H$, a maximum deviation $\Delta_{max}$ can be calculated and the difference $\Delta$ can be compared against maximum deviation $\Delta_{max}$. If the relative deviation $\Delta/D_H$ is greater than the relative maximum deviation or difference $\Delta$ is greater than maximum deviation $\Delta_{max}$, calibration of the first horizontal axis 51 is required. Evaluation device 78 calculates from first height offset $H_1$, second height offset $H_2$ and measurement distance $D_H$ a correction angle $\theta$, which is stored as a new first zero position for orienting the first horizontal axis 51 in the horizontal state. Correction angle $\theta$ can be calculated according to the formula $\tan(\theta) = (H_1 - H_2)/2D_H$.

Measurement distance $D_H$ between rotating laser 11 and laser receiver 12 is determined in a first and/or second measuring procedure by means of rotating laser 11 and laser receiver 12. In doing so, measurement distance $D_H$ between rotating laser 11 and laser receiver 12 can be determined at different times when executing the method according to the invention for checking and/or calibrating a horizontal axis. Measurement distance $D_H$ can be determined as first distance $d_1$ by means of a first measuring procedure, as second distance $d_2$ by means of a second measuring procedure, or as distance d averaged from first and second distances $d_1$, $d_2$. In doing so, first and second distance $d_1$, $d_2$ are determined in a horizontal position of rotating laser 11 and longitudinal arrangement of laser receiver 12.

In the second measuring procedure, the rotating laser 11 is operated in a rotation mode and the rotating first laser beam 22 is moved at a constant speed of rotation $v_R$ around the axis of rotation 21. The second measuring procedure comprises the method steps: rotating laser 11 is oriented horizontally and the first laser beam 22 is moved at a constant speed of rotation $v_R$ around the axis of rotation 21. Evaluation device 78 of laser receiver 12 determines a signal length $t_s$ of rotating first laser beam 22 on detection field 18 of laser receiver 12. Second distance $d_2$ can be calculated from speed of rotation $v_R$ of the first laser beam 22 and the detection width $B_D$ of the detection field 18 according to $t_s/t_{full}=B_D/(2\pi d_2)$ where $t_{full}=60/v_R$. Speed of rotation $v_R$ is indicated in revolutions per minute and time $t_{full}$ required for one revolution is $60/v_R$.

Figure 5A:
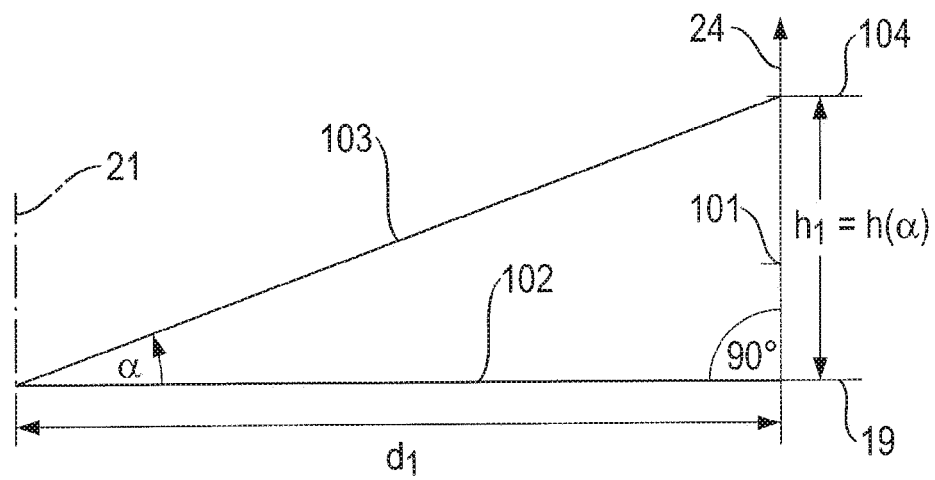
FIGS. 5A-C illustrate three variants of a first measuring procedure for measuring a first distance between the rotating laser and the laser receiver by means of an inclined laser beam.
Figure 5B:
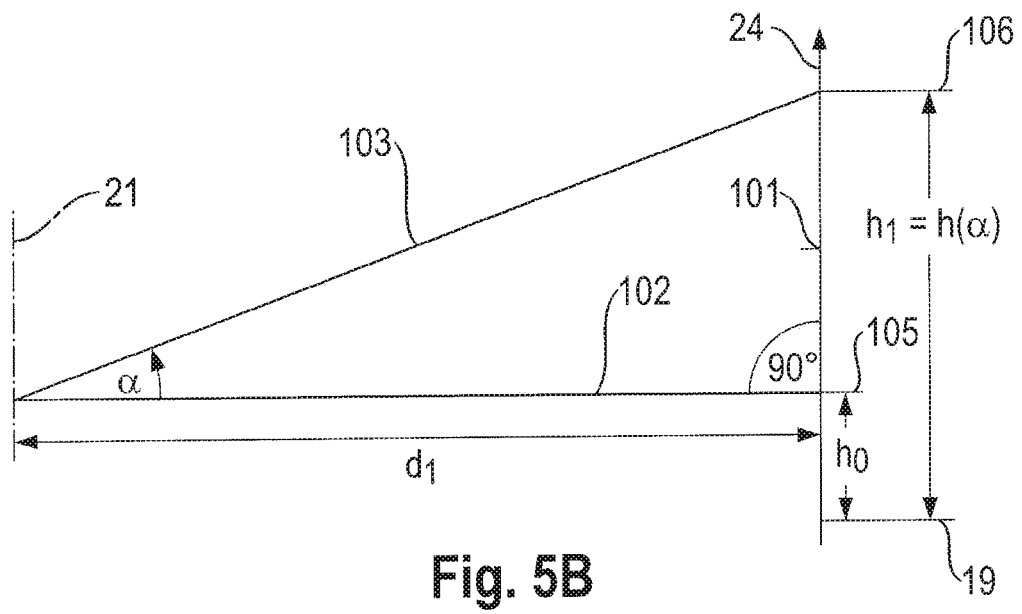
Figure 5C:
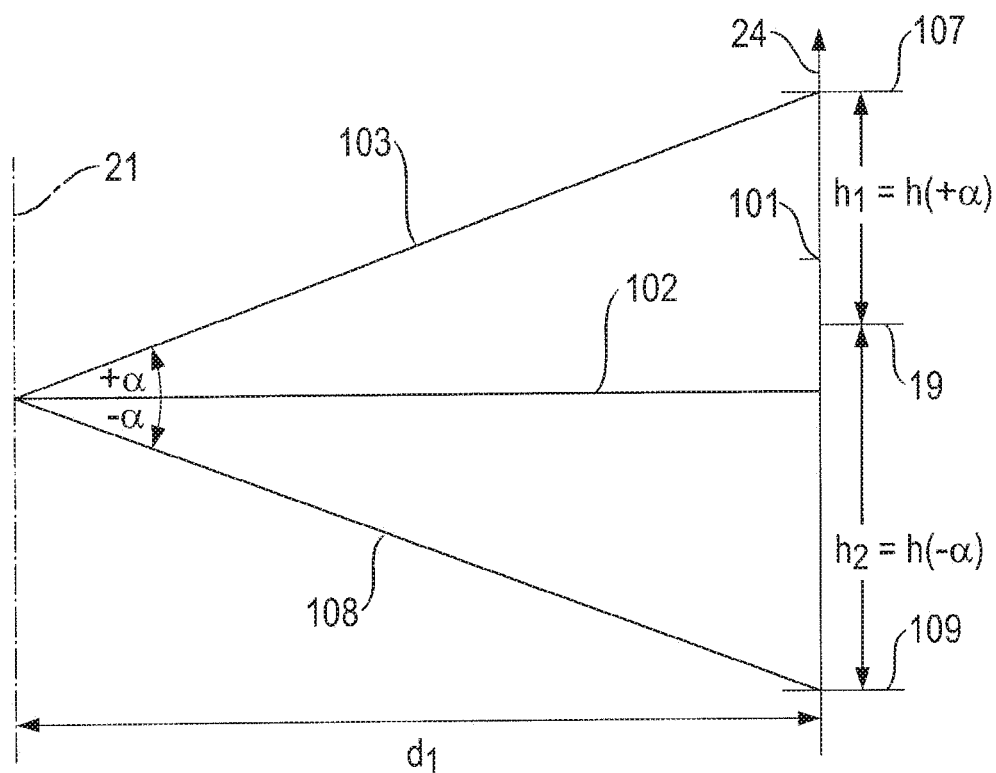

FIGS. 5A-C depict three variants of the first measuring procedure, with which measurement distance $D_H$ between rotating laser 11 and laser receiver 12 as first distance $d_1$ is determined. Laser receiver 12 is oriented parallel to direction of gravity 24 and first distance $d_1$ is measured between axis of rotation 21 of rotating laser 11 and a front side 101 of detection field 18 of laser receiver 12. At the start of the first measuring procedure, horizontal axes 51, 52 of rotating laser 11 are in a horizontal state or are oriented into a horizontal state. Rotating laser 11 projects a horizontally oriented laser beam 102.

During the first measurement process the rotating laser 11 is operated in a spot mode and the laser beam is not moved around the axis of rotation 21. The laser beam is inclined by a known angle of inclination α and the incident position of the inclined laser beam on the detection field 18 of the laser receiver 12 is determined as a measurement point, and the height offset of the measurement point is stored as a height. The inclination of the laser beam can thereby be accomplished by means of the leveling device 54 or the inclination device 61. The use of the leveling device 54 has the advantage that the first distance $d_1$ can also be determined by rotating lasers 11 without an inclination device 61.

The first measurement method requires that the rotating laser 11 be oriented with respect to the laser receiver 12 so that the inclination direction is approximately perpendicular to the detection field 18 of the laser receiver 12. Deviations from the perpendicular orientation result in measurement errors that are acceptable if the variances remain small. If the first horizontal axis 51 is oriented on the detection field 18, the inclination of the laser beam is accomplished by means of the first leveling unit 55, which comprises the first inclination sensor 58 and the first adjusting element 62. Because the first horizontal axis 51 in the exemplary embodiment illustrated in FIGS. 4A-C in the first and second angular positions is oriented toward to the detection field 65, it is advantageous to determine the first distance $d_1$ during the method according to the invention in the first or second angular position. Alternatively, the first distance d1 can be determined in a separate measurement routine before the method according to the invention.

FIG. 5A depicts the first variant of the first measuring procedure. The horizontally oriented laser beam 102 is adjusted to zero position 19 of laser receiver 12. The orientation of the laser beam 102 to the zero position can be done, for example, with an adjustable-height tripod. For a fully automated design, a tripod with an "auto-alignment function" of the type described in European Patent EP 1 203 930 B1 can be used. The laser beam is then inclined using the corresponding leveling unit of leveling device 54 or inclination device 61 by inclination angle α. The incident position of inclined laser beam 103 on detection field 18 of laser receiver 12 is determined as first measuring point 104 and the distance of first measuring point 104 to zero position 19 is stored as first height $h_1=h(\alpha)$. First distance d1 can be calculated from inclination angle α and the height difference between the first height ($h_1=h(\alpha)$) and zero position 19 of detection field 18. When zero position 19 corresponds to a height of 0 mm, first distance d1 can be calculated according to $\tan(\alpha)=h(\alpha)/d_1$.

FIG. 5B depicts the second variant of the first measuring procedure. The horizontally oriented laser beam 102 is projected to detection field 18 of laser receiver 12. The incident position of laser beam 102 on detection field 18 is determined as reference point 105 and the distance to reference point 105 to zero position 19 is stored as reference height $h_0=h(0°)$. The laser beam is then inclined by inclination angle α and the incident position of inclined laser beam 103 on detection field 18 is determined as first measuring point 106 and the distance of first measuring point 106 from zero position 19 is stored as first height $h_1=h(\alpha)$. First distance $d_1$ can be calculated from inclination angle α and the height difference between the first height $h_1=h(\alpha)$ and the reference height $h_0-h(0°)$ according to $\tan(\alpha)=(h_1-h_0)/d_1$.

FIG. 5C depicts the third variant of the first measuring procedure. The horizontally oriented laser beam 102 is inclined in a positive inclination direction by inclination angle α. The incident position of inclined laser beam 103 on detection field 18 is determined as first measuring point 107 and the distance of first measuring point 107 from zero position 19 is stored as first height $h_1=h(+\alpha)$. Then the laser beam is inclined to a negative inclination direction, opposite the positive inclination direction, by a negative inclination angle $-\alpha$. The incident position of inclined laser beam 108 on detection field 18 is determined as second measuring point 109 and the distance of second measuring point 109 from zero position 19 is stored as second height $h_2=h(-\alpha)$. First distance $d_1$ can be calculated from inclination angle α and the height difference between the first height $h_1=h(+\alpha)$ and the second height $h_2=h(-\alpha)$ according to $\tan(2\alpha)=(h(+\alpha)-h(-\alpha))/d_1$.

The formulas to calculate measurement distance $D_H$ between rotating laser 11 and laser receiver 12 and the formulas to calculate correction angle $\theta_1$ when calibrating a horizontal axis apply to a laser receiver 12, which is oriented parallel to direction of gravity 24. To correct measuring errors due to a non-plumb orientation of laser receiver 12, laser receiver 12 comprises sensor module 82, with which the inclination of laser receiver 12 is measured relative to direction of gravity 24.

Figure 6A:
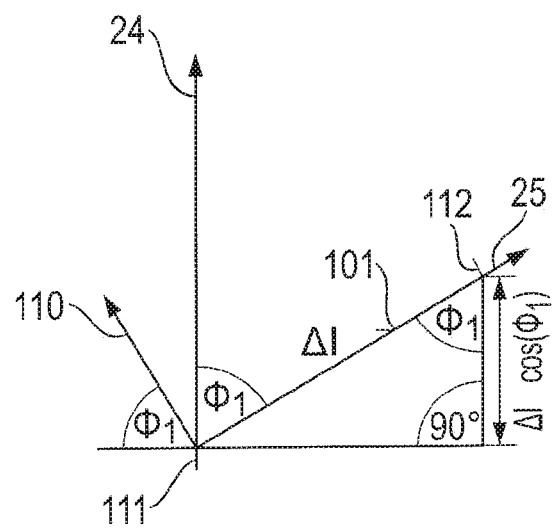
FIGS. 6A, B illustrate the laser receiver, which is inclined to a direction of gravity by a first vertical angle (FIG. 6A) and a second vertical angle (FIG. 6B), in a schematic illustration.
Figure 6B:
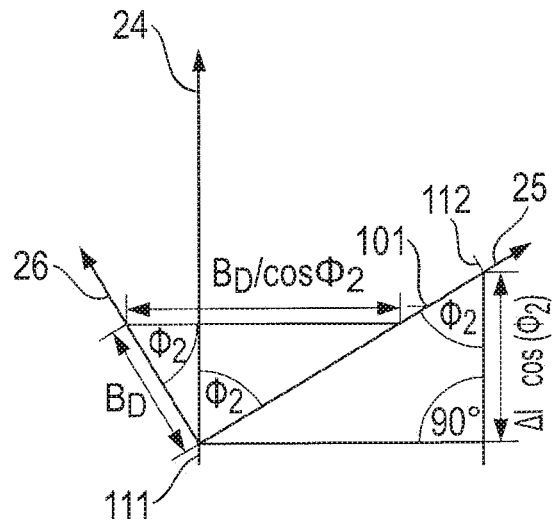

FIGS. 6A, B depict the orientation of laser receiver 12 in a schematic illustration, wherein laser receiver 12 may be inclined to direction of gravity 24 by a first vertical angle $\varphi_1$ and/or a second vertical angle $\varphi_2$. FIG. 6A thereby depicts laser receiver 12, which is inclined in a first vertical plane by first vertical angle $\varphi_1$, and FIG. 6B depicts laser receiver 12, which is inclined in a second vertical plane by a second vertical angle $\varphi_2$. The first vertical plane is spanned by direction of gravity 24 and a perpendicular vector 110 of detection field 18, and the second vertical plane is spanned by longitudinal direction 25 and transverse direction 26 of detection field 18. First vertical angle $\varphi_1$ is measured between perpendicular vector 110 and direction of gravity 24, wherein first vertical angle $\varphi_1$ represents a deviation of 90°, and second vertical angle $\varphi_2$ is measured between direction of gravity 24 and longitudinal direction 25 of detection field 18.

A first laser beam strikes detection field 18 of laser receiver 12 and produces a first incident position 111. A second laser beam strikes detection field 18 of laser receiver 12 and produces a second incident position 112. Evaluation device 78 of laser receiver 12 calculates a distance $\Delta I$ between first incident position 111 and second incident position 112. In the method for checking and/or calibrating a horizontal axis, distance $\Delta I$ corresponds to the difference $\Delta$ from the first height offset $H_1$ and second height offset $H_2$, and in the distance measurement using the first measuring procedure, distance $\Delta I$ corresponds to height difference $\Delta h$ between first height $h_1$ and second height $h_2$.

If laser receiver 12 is inclined by first vertical angle $\varphi_1$, horizontal distance $v_1$ perpendicular to direction of gravity 24 in the first vertical plane is less than distance $\Delta I$ that the detection field 18 of laser receiver 12 measured (FIG. 6A). For horizontal distance $v_1$, $\Delta I \cdot \cos(\varphi_1)$. If laser receiver 12 is inclined by second vertical angle $\varphi_2$ with respect to the direction of gravity 24, horizontal distance $v_2$ in the second vertical plane is less than distance $\Delta I$ that the detection field 18 of laser receiver 12 measured (FIG. 6B). For horizontal distance $v_2$, the correlation is $\Delta I \cdot \cos(\varphi_2)$. When laser receiver 12 is inclined in relation to direction of gravity 24 by first vertical angle $\varphi_1$ and second vertical angle $\varphi_2$, the horizontal distance perpendicular to direction of gravity 24 is found by the formula $\Delta I \cdot \cos(\varphi_1) \cdot \cos(\varphi_2)$. In the formulas that use the measuring function of laser receiver 12 and measure distances $\Delta I$ on detection field 18, the distances $\Delta I$ are multiplied by a correction factor $\cos(\varphi_1) \cdot \cos(\varphi_2)$. The correction factor $\cos(\varphi_1) \cdot \cos(\varphi_2)$ is to be taken into account in the distance measurement of first distance $d_1$ using the first measuring procedure when determining difference $\Delta$ between first and second control points 92, 93 and calculating correction angle $\theta$ within the scope of the method according to the invention.

Second vertical angle $\varphi_2$ should also be taken into account in calculating second distance $d_2$ by means of second measuring procedure. By inclining laser receiver 12 by second vertical angle $\varphi_2$, the horizontal distance in direction of gravity 24 the rotating first laser beam 22 passes over on detection field 18 is greater than detection width $B_D$ of detection field 18 in transverse direction 26. The signal length of the rotating first laser beam 22 corresponds to the horizontal separation on detection field 18. For the horizontal distance, the correlation is $B_D/\cos(\varphi_2)$ applies. An inclination of laser receiver 12 by first vertical angle $\varphi_1$ does not change the horizontal distance the second laser beam 22 passes over on detection field 18.

Figure 7A:
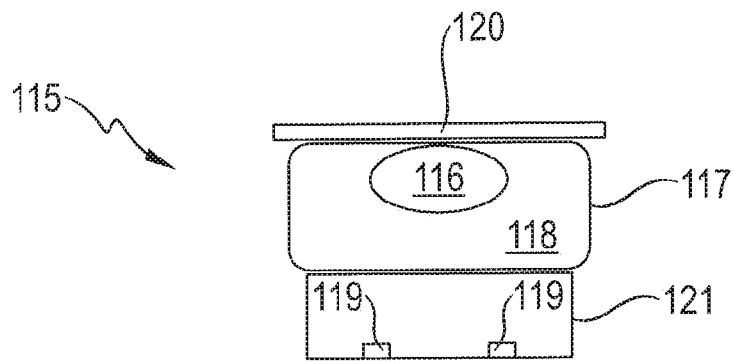
FIGS. 7A-C illustrate the setup of an optical inclination sensor with a gas bubble (FIG. 7A), a characteristic curve that represents a zero position of the inclination sensor as a function of a temperature (FIG. 7B), and another characteristic curve that represents the temperature as a function of a bubble length of the gas bubble (FIG. 7C).
Figure 7A:
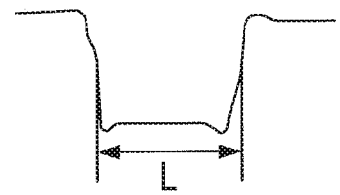
Figure 7B:
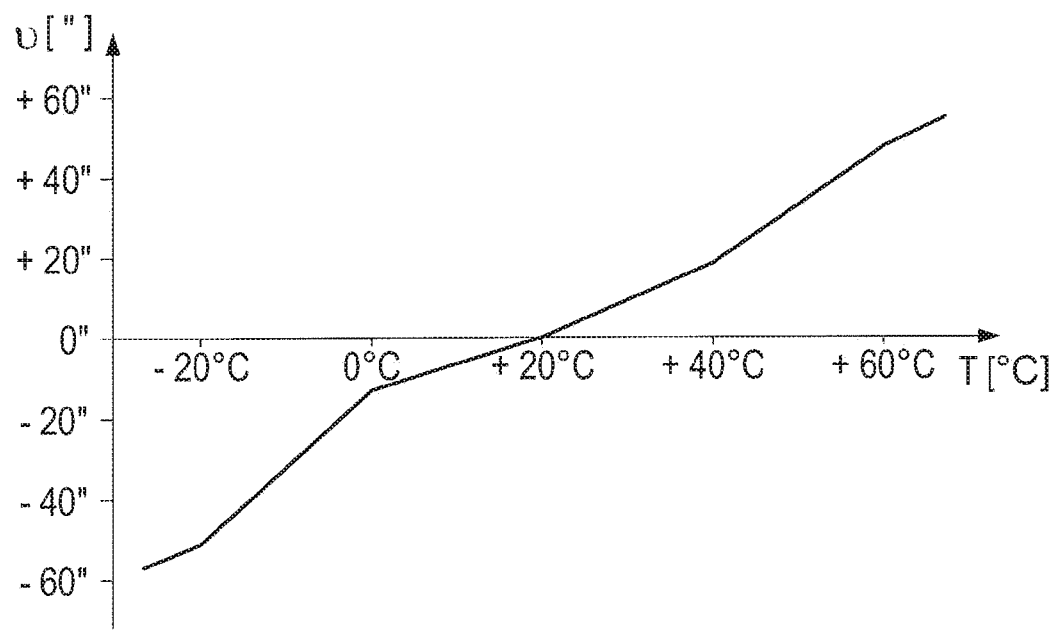
Figure 7C:
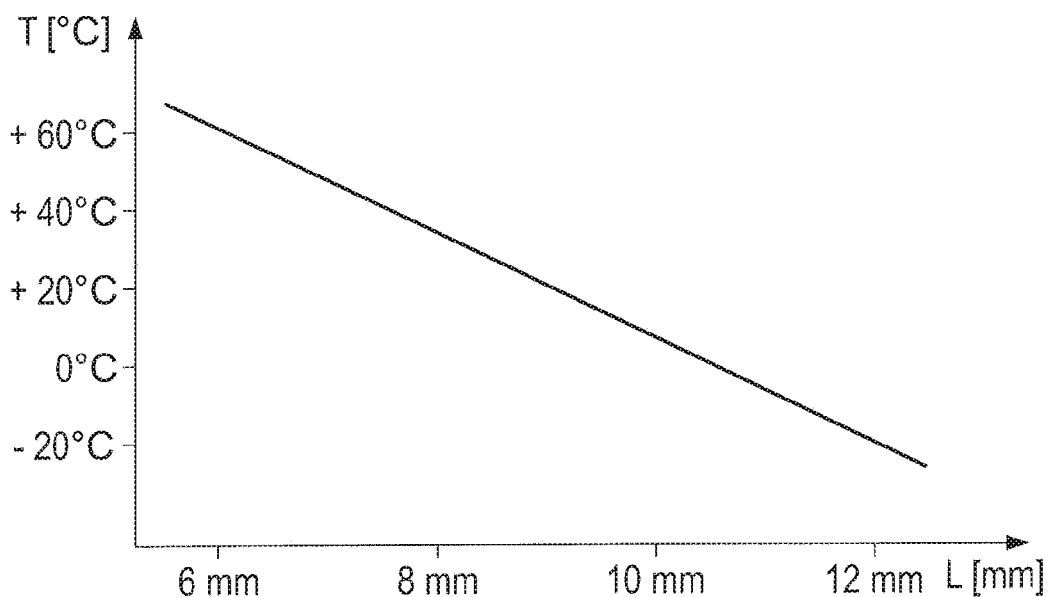

FIGS. 7A-C depict the setup of an optical inclination sensor 115 having a gas bubble 116 (FIG. 7A), a characteristic curve that represents the zero position v of inclination sensor 115 as a function of a temperature T (FIG. 7B), and another characteristic curve that represents temperature T as a function of a bubble length L of gas bubble 116 (FIG. 7C).

For outdoor applications of rotating laser 11, solar radiation may result in temperature fluctuations in device housing 31 of rotating laser 11, so that the measured temperature depends on the position of temperature sensor 89 in unit housing 31. To reduce measurement errors in the temperature measurement, the temperatures of inclination sensors 58, 59 can be measured. The temperature of first inclination sensor 58 is referred to as first temperature T, and the temperature of second inclination sensor 59 as second temperature $T_2$. The temperature is measured by means of the inclination sensors 58, 59. Temperature measurements using inclination sensors 58, 59 have the advantage that temperatures $T_1$, $T_2$ are measured exactly at the location in unit housing 31 of the rotating laser 11 which is relevant for orienting the first and second horizontal axes 51, 52.

FIG. 7A depicts the components of inclination sensor 115, whose structure corresponds to inclination sensors 58, 59 of rotating laser 11. Inclination sensor 115 comprises a housing 117, which is filled with gas bubble 116 and a liquid 118, a light source 119, a photo detector 120, and a spacer 121. Gas bubble 116 has a bubble length L, which is temperature-dependent and thus suitable as a measurement variable for temperature T. Bubble length L of gas bubble 116 can be measured using light source 119 and photo detector 120. To differentiate between the first and second inclination sensors 58, 59, the components are provided with an index, which is separated from the reference number by a hyphen. First inclination sensor 58 has index "1" and second inclination sensor 59 has index "2."

FIG. 7B depicts a characteristic curve that represents zero position v of inclination sensor 115 as a function of temperature T. The characteristic curve produces for the approved temperature range of rotating laser 11 from −20° C. to +50° C. a relationship between the temperature of inclination sensor 115 and zero position v of inclination sensor 115, which corresponds to the orientation in the defined state of inclination sensor 115. In control device 89 of rotating laser 11, there is stored a first characteristic curve representing first zero position $v_1$ of first inclination sensor 58 as a function of first temperature $T_1$, and a second characteristic curve representing second zero position $v_2$ of second inclination sensor 59 as a function of second temperature $T_2$.

FIG. 7C depicts another characteristic curve, which represents temperature T as a function of bubble length L of gas bubble 116. The characteristic curve for the approved temperature range of rotating laser 11 from −20° C. to +50° C. indicates a relationship between the temperature T of inclination sensor 115 and bubble length L of gas bubble 116. Bubble length L of gas bubble 116 varies in linear fashion with temperature T of inclination sensor 115, wherein bubble length L decreases as temperature T drops. In control device 89 of rotating laser 11, there are stored a third characteristic curve representing first temperature $T_1$ as a function of first bubble length $L_1$ of first gas bubble 116-1, and a fourth characteristic curve representing second temperature $T_2$ as a function of second bubble length $L_2$ of second gas bubble 116-2.

Alternatively, the characteristic curve, which represents zero position v of inclination sensor 115 as a function of temperature T, can be replaced by a characteristic curve that represents zero position v of inclination sensor 115 as a function of bubble length L of gas bubble 116. In this case, there is in control device 89 of rotating laser 11 a first characteristic curve that represents first zero position $v_1$ of first inclination sensor 58 as a function of first bubble length $L_1$ of first gas bubble 116-1 and a second characteristic curve representing second bubble length $v_2$ of second inclination sensor 59 as a function of second bubble length $L_2$ of second gas bubble 116-2.

The invention claimed is:

1. A method for checking and/or calibrating a first (51) or second (52) horizontal axis of a rotating laser (11), which projects a laser beam (22) rotatable about an axis of rotation (21), comprising the steps of:
    positioning the rotating laser (11) at a measurement distance ($D_H$) to a laser receiver (12), wherein the rotating laser (11) is oriented in a horizontal position and the laser receiver (12) is positioned in a longitudinal arrangement;
    orienting the first and the second horizontal axes (51, 52) of the rotating laser (11) in a horizontal state, wherein the horizontal state of the horizontal axes (51, 52) is established by a first zero position ($v_1$) for the first horizontal axis (51) and a second zero position ($v_2$) for the second horizontal axis (52);
    arranging the rotating laser (11) in a first angular position, wherein the horizontal axis to be checked is oriented in the first angular position on a detection field (18) of the laser receiver (12);
    determining an incident position of the laser beam (22) on the detection field (18) of the laser receiver (12) as a first control point (92) and storing a distance of the first control point (92) from a zero position (19) of the detection field (18) as a first height offset ($H_1$);
    arranging the rotating laser (11) in a second angular position, wherein the second angular position is rotated 180° about the axis of rotation (21);
    determining the incident position of the laser beam (22) on the detection field (18) of the laser receiver (12) as a second control point (93) and storing a distance of the second control point (93) from the zero position (19) of the detection field (18) as a second height offset ($H_2$);
    calculating a distance between the first control point (92) and the second control point (93) as a difference ($\Delta=H_1-H_2$) from the first and the second height offsets ($H_1$, $H_2$);
    determining the measurement distance ($D_H$) between the rotating laser (11) and the laser receiver (12); and
    comparing the difference ($\Delta$) against a maximum difference ($\Delta_{max}$).

2. The method according to claim 1, wherein the measurement distance ($D_H$) between the rotating laser (11) and the laser receiver (12) is determined by the laser beam (22) and the laser receiver (12).

3. The method according to claim 2, wherein the measurement distance ($D_H$) between the rotating laser (11) and the laser receiver (12) is determined as a first distance ($d_1$) using a first measuring procedure, as a second distance ($d_2$) using a second measuring procedure, or as a distance (d) averaged from the first and the second distances ($d_1$, $d_2$).

4. The method according to claim 3, wherein the rotating laser (11) is oriented horizontally, a horizontally oriented laser beam (102) is adjusted to the zero position (19) of the detection field (18), the horizontally oriented laser beam is inclined in a direction of the laser receiver (12) at an inclination angle ($\alpha$), an incident position of the inclined laser beam (103) on the detection field (18) of the laser receiver (12) is determined as a first measuring point (104), a distance of the first measuring point (104) from the zero position (19) of the detection field (18) is stored as a first height ($h_1=h(\alpha)$), and the first distance ($d_1$) is calculated from the inclination angle ($\alpha$) and a height difference ($\Delta h$) between the first height ($h_1=h(\alpha)$) and the zero position (19) of the detection field (18).

5. The method according to claim 3, wherein the rotating laser (11) is oriented horizontally, an incident position of a horizontally oriented laser beam (102) on the detection field (18) of the laser receiver (12) is determined as a reference point (105), a distance of the reference point (105) to the zero position (19) of the detection field (18) is stored as a reference height ($h_0$), the horizontally oriented laser beam is inclined at an inclination angle ($\alpha$), an incident position of the inclined laser beam (103) on the detection field (18) of the laser receiver (12) is determined as a first measuring point (106), a distance of the first measuring point (106) from the zero position (19) of the detection field (18) is stored as a first height ($h_1=h(\alpha)$), and the first distance ($d_1$) is calculated from the inclination angle ($\alpha$) and a height difference ($\Delta h=h_1-h_0$) between the first height ($h_1$) and the reference height ($h_0$).

6. The method according to claim 3, wherein the rotating laser (11) is oriented horizontally, a horizontally oriented laser beam (102) is inclined in an inclination direction at an inclination angle ($\alpha$), an incident position of the inclined laser beam (103) on the detection field (18) of the laser receiver (12) is determined as a first measuring point (107), a distance of the first measuring point (107) to the zero position (19) of the detection field (18) is stored as first height ($h_1=h(\alpha)$), the horizontally oriented laser beam is inclined in an opposite inclination direction at a negative inclination angle ($-\alpha$), an incident position of the oppositely inclined laser beam (108) on the detection field (18) is determined as a second measuring point (109), a distance of the second measuring point (109) from the zero position (19) of the detection field (18) is stored as a second height ($h_2=h(-\alpha)$) and the first distance ($d_1$) is calculated from the inclination angle ($\alpha$) and a height difference ($\Delta h=h_1-h_2$) between the first height ($h_1$) and the second height ($h_2$).

7. The method according to claim 3, wherein the rotating laser (11) is oriented horizontally, a horizontally oriented laser beam (102) is moved at a speed of rotation ($v_R$), a signal length ($t_s$) of the horizontally oriented laser beam (102) on the detection field (18) of the laser receiver (12) is determined, and the second distance ($d_2$) is calculated from the speed of rotation ($v_R$), the signal length ($t_s$), and a detection width ($B_D$) of the detection field (18).

8. The method according to claim 1, wherein an inclination of the laser receiver (12) relative to a direction of gravity (24) is determined as a first vertical angle ($\varphi_1$) in a first vertical plane and/or as a second vertical angle ($\varphi_2$) in a second vertical plane, wherein the first vertical plane is spanned by the direction of gravity (24) and a perpendicular vector (110) of the detection field (18) of the laser receiver (12), and wherein the second vertical plane is spanned by a longitudinal direction (25) and a transverse direction (26) of the detection field (18).

9. The method according to claim 8, wherein the first vertical angle ($\varphi_1$) and/or the second vertical angle ($\varphi_2$) are multiplied by an angle-dependent correction factor ($\cos(\varphi_1)$, $\cos(\varphi_2)$, $1/\cos(\varphi_2)$).

10. The method according to claim 1, wherein for the orientation of the horizontal axis (51, 52) to be checked, a plurality of zero positions ($v_1$, $v_2$) are recorded as a function of a temperature (T) or of a measured value (L) that is dependent on the temperature (T) and are stored in a characteristic curve.

11. The method according to claim 10, wherein the temperature or the measured value (L) of the rotating laser (11) is measured, a zero position ($v_1$, $v_2$) associated with the temperature (T) or measured value (L) is determined from the characteristic curve, and the horizontal axis (51, 52) is oriented in the state defined by the zero position ($v_1$, $v_2$).

12. The method according to claim 11, wherein the temperature (T) is measured by an inclination sensor (115) which includes a housing (117) that is filled with a liquid (118) and a gas bubble (116), a light source (119) and a photo detector (120).

13. The method according to claim 12, wherein an additional characteristic curve of a temperature (T) and bubble length (L) of the gas bubble (116) is stored, the bubble length (L) of the gas bubble (116) is measured using the light source (119) and the photo detector (120), and the temperature (T) associated with the measured bubble length (L) is determined by the additional characteristic curve.

14. The method according to claim 1, wherein a correction angle (θ) is calculated from the measurement distance ($D_H$), the first height offset ($H_1$) and the second height offset ($H_2$) and wherein the correction angle (θ) is stored as a new zero position for the horizontal axis (51, 52) to be checked when the difference (Δ) is greater than the maximum difference ($Δ_{max}$).

15. The method according to claim 14, wherein the calibrated horizontal axis (51, 52) is checked in an additional check loop, wherein the horizontal state of the horizontal axis (51, 52) is defined by the new zero position.

* * * * *